(12) United States Patent
Rugeland et al.

(10) Patent No.: US 12,047,802 B2
(45) Date of Patent: Jul. 23, 2024

(54) QUANTIZED EARLY MEASUREMENTS

(71) Applicant: Telefonaktiebolaget LM Ericsson (publ), Stockholm (SE)

(72) Inventors: Patrik Rugeland, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 246 days.

(21) Appl. No.: 17/598,835

(22) PCT Filed: Mar. 23, 2020

(86) PCT No.: PCT/SE2020/050299
§ 371 (c)(1),
(2) Date: Sep. 27, 2021

(87) PCT Pub. No.: WO2020/197474
PCT Pub. Date: Oct. 1, 2020

(65) Prior Publication Data
US 2022/0182868 A1 Jun. 9, 2022

Related U.S. Application Data

(60) Provisional application No. 62/825,445, filed on Mar. 28, 2019.

(51) Int. Cl.
*H04W 24/10* (2009.01)
*H04W 24/02* (2009.01)
*H04W 76/15* (2018.01)

(52) U.S. Cl.
CPC ........... *H04W 24/10* (2013.01); *H04W 24/02* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 2010/0315957 A1* | 12/2010 | Koo | .................... | H04B 7/15592 455/67.11 |
| 2017/0170941 A1* | 6/2017 | Yang | ..................... | H04W 24/10 |

(Continued)

FOREIGN PATENT DOCUMENTS

| WO | 2020167182 A1 | 8/2020 |
|---|---|---|
| WO | 2020167205 A1 | 8/2020 |
| WO | 2020190197 A1 | 9/2020 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.5.0, Mar. 2019, 3GPP Organizational Partners, 948 pages.

(Continued)

*Primary Examiner* — Brian S Roberts
(74) *Attorney, Agent, or Firm* — Withrow & Terranova, PLLC

(57) ABSTRACT

Methods for reporting quantized early measurements to a network node are provided. In examples disclosed herein, a wireless device may perform an early measurement(s) during a dormant state. When the wireless device transitions from the dormant state to a connected state, the wireless device quantizes the early measurement(s) and reports at least a subset of the quantized early measurement(s) to the network node. By quantizing the early measurements, it may be possible to generate an early measurement report with reduced size, thus making it possible to include or multiplex the early measurement report in an uplink message with limited transport blocks. As a result, the network node may expedite connection setup for Carrier Aggregation (CA) and (Continued)

Dual Connectivity (DC). In addition, it may be possible to protect the early measurement report before security activation.

21 Claims, 16 Drawing Sheets

(56) References Cited

U.S. PATENT DOCUMENTS

2018/0368018 A1* 12/2018 Kim .................. H04L 69/08
2019/0037425 A1* 1/2019 Hong ................ H04W 72/23
2019/0306739 A1* 10/2019 Kim ................. H04L 5/0096

OTHER PUBLICATIONS

Author Unknown, "Technical Specification Group Radio Access Network; NR; Radio Resource Control (RRC) protocol specification (Release 15)," Technical Specification 38.331, Version 15.5.0, Mar. 2019, 491 pages.

Ericsson, "R2-1900693: Signalling of early measurements for CA/DC setup," 3GPP TSG-RAN WG2 #105, Feb. 25-Mar. 1, 2019, Athens, Greece, 9 pages.

Ericsson (Rapporteur), "R2-19XXXXX: Email discussion [105#53][LTE_NR_DC_CA_enh-Core] Early measurements Signalling," 3GPP TSG-RAN WG2, Meeting #105bis, Apr. 8-12, 2019, Xi'an, China, 12 pages.

LG Electronics Inc., "R2-1902014: Fast setup MR-DC and NR CA with early measurement reporting," 3GPP TSG-RAN WG2 #105, Feb. 25-Mar. 1, 2019, Athens, Greece, 4 pages.

Qualcomm Incorporated, "R2-1900104: Supporting early measurement reporting in NR," 3GPP TSG RAN WG2, Meeting #105, Feb. 25-Mar. 1, 2019, Athens, Greece, 15 pages.

International Preliminary Report on Patentability for International Patent Application No. PCT/SE2020/050299, mailed Jun. 10, 2021, 9 pages.

International Search Report and Written Opinion for International Patent Application No. PCT/SE2020/050299, mailed Jun. 24, 2020, 9 pages.

* cited by examiner

NOTE: THE ACTION OF MOVING TO DORMANT IS CALLED "HYBERNATION"

3GPP Scenarios, LTE and NR Interworking Options

*Early measurement reporting in msg5 during transition from suspended mode to connected mode*

*Early measurement reporting in msg3 during transition from suspended mode to connected mode*

QUANTIZED EARLY MEASUREMENTS

RELATED APPLICATIONS

This application is a 35 U.S.C. § 371 national phase filing of International Application No. PCT/SE2020/050299, filed Mar. 23, 2020, which claims the benefit of provisional patent application Ser. No. 62/825,445, filed Mar. 28, 2019, the disclosures of which are hereby incorporated herein by reference in their entireties.

TECHNICAL FIELD

The technology of the disclosure relates generally to reporting quantized early measurements in a wireless communications network, such as a Fifth Generation (5G) New Radio (NR) cellular communications network.

BACKGROUND

I. Carrier Aggregation (CA) and Dual Connectivity (DC) in Long Term Evolution (LTE)

In LTE Release 10, CA was introduced in LTE to enable a User Equipment (UE) to transmit/receive information via multiple cells (so called Secondary Cells—SCell(s)) in multiple carrier frequencies such that the UE can benefit from the existence of non-contiguous and contiguous carriers. In CA terminology, a Primary Cell (PCell) refers to the cell that the UE established a Radio Resource Control (RRC) connection with or did handover to. As shown in FIG. 1, cells are aggregated on Medium Access Control (MAC) level. MAC gets grants for a certain cell and multiplexes data from different bearers into a transport block being communicated in the said cell. Also, MAC controls how that process is done.

SCells may be "added" (a.k.a., "configured") for the UE using RRC signaling (e.g., RRCConnectionReconfiguration), which may take hundreds of milliseconds to complete. A cell that is configured for the UE becomes a "serving cell" for this UE. A SCell may also be associated to a SCell state. When configured/added via RRC, a SCell starts in deactivated state. In LTE Release 15, an enhanced or evolved Node B (eNB) can provide an indication to activate-upon-configuration, or change the state, at least in RRCConnectionReconfiguration, as shown below:

```
1> for each SCell configured for the UE other than the PSCell:
   2> if the received RRCConnectionReconfiguration message includes sCellState for the
      SCell and indicates activated:
      3> configure lower layers to consider the SCell to be in activated state;
   2> else if the received RRCConnectionReconfiguration message includes sCellState for the
      SCell and indicates dormant:
      3> configure lower layers to consider the SCell to be in dormant state;
   2> else:
      3> configure lower layers to consider the SCell to be in deactivated state;
```

In LTE Release 15, a new intermediate state (called dormant state) between the deactivated state and the active state has been introduced for enhanced uplink operation. A MAC Control Element (CE) can be used to change the SCell state between the three states as shown below and in in FIG. 2. There are also timers in MAC to move a cell between deactivated/activated/dormant. These timers are:

- sCellHibernationTimer; which changes the SCell from the activated state to the dormant state,
- sCellDeactivationTimer; which changes the SCell from the activated state to the deactivated state,
- dormantSCellDeactivationTimer; which changes the SCell from the dormant state to the deactivated state.

The MAC level SCell activation takes approximately 20-30 milliseconds (ms) to complete.

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on SCell(s) or potential SCell(s) in a given available carrier, the network may configure the UE to perform Radio Resource Management (RRM) measurements.

Typically, the network may be assisted by RRM reported by a UE. As shown in FIG. 3, the network may configure the UE with measurement identifiers (IDs) associated to reportConfig with event A1 (serving becomes better than threshold) in case this is a configured SCell, or A4 (neighbor becomes better than threshold) for carriers without a configured SCell. The measurement objects are associated to the carrier the network wants reports on. If the network is aware of the exact cells it wants the UE to measure, a so-called white cell list can be configured in the measurement object so that the UE is only required to measure these cells in that carrier.

With the later introduction of DC in Release 12, it was possible to add what is called Secondary Cell Group (SCG) configuration to the UE. The main benefit would be that the UE could in principle add a cell from another eNB. Protocol wise, DC may require different MAC entities, one for each cell group. Accordingly, the UE may have two cell groups, one associated to the PCell (master node) and another associated to a Primary Secondary Cell (PSCell) (of the secondary eNB), where each group may possibly have respective associated SCells.

When it comes to adding SCells, when the UE is in single connectivity, for example, the RRCConnectionReconfigura tion message may include a cell index (so MAC identifiers are optimized, i.e., shorter), a cell identifier and carrier frequency, a common parameter(s), and a state information as later introduced in Release 15 (activated or dormant).

```
SCellToAddModList-r10 ::=              SEQUENCE (SIZE (1..maxSCell-r10)) OF
  SCellToAddMod-r10
SCellToAddMod-r10 ::=                  SEQUENCE {
  sCellIndex-r10                         SCellIndex-r10,
  cellIdentification-r10                 SEQUENCE {
    physCellId-r10                         PhysCellId,
    dl-CarrierFreq-r10                     ARFCN-ValueEUTRA
  }                                                       OPTIONAL,-- Cond
SCellAdd
  radioResourceConfigCommonSCell-r10           RadioResourceConfigCommonSCell-r10
  OPTIONAL, -- Cond SCellAdd
  radioResourceConfigDedicatedSCell-r10        RadioResourceConfigDedicatedSCell-r10
  OPTIONAL, -- Cond SCellAdd2
  ...,
  [[ dl-CarrierFreq-v1090                ARFCN-ValueEUTRA-v9e0 OPTIONAL --
Cond EARFCN-max
  ]],
  [[ antennaInfoDedicatedSCell-v10i0     AntennaInfoDedicated-v10i0 OPTIONAL --
Need ON
  ]],
  [[ srs-SwitchFromServCellIndex-r14     INTEGER (0.. 31) OPTIONAL-- Need ON
  ]],
  [[ sCellState-r15                      ENUMERATED {activated, dormant} OPTIONAL
  -- Need ON
  ]]
}
```

II. Inter-Radio Access Technology (RAT) and Inter Fifth Generation (5G) Core (5GC) Interworking in LTE and New Radio (NR)

The Third Generation Partnership Project (3GPP) introduced a new core network (5GC) and a new Radio Access Network (RAN) (NR) for 5G. The core network, 5GC, will however, also support other RATs than NR. It has been agreed that LTE (or Evolved Universal Terrestrial Radio Access (E-UTRA)) should also be connected to 5GC. LTE base stations (eNBs) that are connected to 5GC are called next generation eNBs (ng-eNBs) and are part of the Next Generation RAN (NG-RAN), which also consists of NR base stations called gNBs. FIG. 4 shows how the base stations are inter-connected to each other and to other network nodes in 5GC.

The 5G network may be deployed with or without interworking with LTE (also referred to as E-UTRA) and Evolved Packet Core (EPC), as depicted in FIG. 5. In principle, NR and LTE can be deployed without any interworking, denoted by NR Stand-Alone (SA) operation. As illustrated in Options 1 and 2 in FIG. 5, the gNB in NR can be connected to 5GC and the eNB in LTE can be connected to EPC with no interconnection with the gNB. Option 3 in FIG. 5 illustrates a first supported version of NR known as E-UTRA NR DC (EN-DC). In the deployment of Option 3, DC between NR and LTE can be supported with LTE as a master node (Master eNB (MeNB)) and NR as a secondary node. The RAN node (gNB) supporting NR may not have a control plane connection to EPC; instead, the gNB relies on the LTE as the MeNB. In this regard, Option 3 may also be referred to as "Non-standalone NR". Notice that in this case the functionality of an NR cell is limited and would be used for connected mode UEs as a booster and/or diversity leg, but an RRC_IDLE UE cannot camp on these NR cells.

With the introduction of 5GC, other configuration options may become viable. As mentioned above, Option 2 supports SA NR deployment wherein the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 are other variants of DC between LTE and NR, which may be standardized as part of NG-RAN connected to 5GC, denoted by Multi-Radio DC (MR-DC). Under the MR-DC umbrella, it may be possible to enable the following options:

EN-DC (Option 3): LTE is the master node and NR is the secondary node (EPC Core Network (CN) employed)
NR-DC (Option 4): NR is the master node and LTE is the secondary node (5GC employed)
Next Generation DC (NGEN-DC) (Option 7): LTE is the master node and NR is the secondary node (5GC employed)
NR-DC (variant of Option 2): DC where both the master and secondary nodes are NR (5GC employed).

As deployment of the above options may differ for different operators, it may be possible to have deployments with multiple options supported concurrently in the same network. For example, it may be possible for an eNB base station to support Options 3, 5, and 7 concurrently in the same network and for a NR base station to support Options 2 and 4 concurrently. In combination with DC solutions between LTE and NR, it may also be possible to support CA in each cell group (e.g., Master Cell Group (MCG) and Secondary Cell Group (SCG)) and DC between nodes based on the same RAT (e.g., NR-NR DC). For LTE cells, an implication of these different deployments is the coexistence of LTE cells associated to eNBs connected to EPC, 5GC, or both EPC/5GC.

III. Suspend/Resume in LTE and Relation to CA/SCell and SCG Additions

A very typical scenario/use case is that a UE can have a burst traffic (e.g., video packets) that comes and goes. For example, the UE can be idle of transmission/reception for a period of time and then becomes active again. To save UE power, the network transitions the UE from connected state to idle state during the idle periods. Then, the UE can become active again (either via paging or UE request to get connected) to access the network.

In LTE Release 13, a mechanism was introduced for the UE to be suspended by the network in a suspended state similar to RRC_IDLE, with the difference in that the UE stores the Access Stratum (AS) context or RRC context. This makes it possible to reduce the signaling when the UE becomes active again by resuming the RRC connection, without having to establish the RRC connection from scratch. As a result, it may be possible to reduce latency (e.g., for smart phones accessing the Internet) and/or signaling overheads to reduce battery consumption for machine type devices sending very little data.

To transition from the idle state to the connected state, the Release 13 solution requires the UE to send an RRCConnectionResumeRequest message to the network. In response, the UE may receive an RRCConnectionResume from the network. The RRCConnectionResume may not be encrypted but can be integrity protected.

The resume procedure in LTE can be found in the RRC specifications (Technical Specification (TS) 36.331). As the UE resumes from RRC_IDLE (with suspended AS context), the resume procedure triggers a transition from RRC_IDLE to RRC_CONNECTED. Hence, the resume procedure is described in the same subclause that describes the RRC connection establishment (subclause 5.3.3 RRC connection establishment).

There are few things relevant to highlight in the SCG configurations and SCell configurations for MCGs in relation to suspend/resume procedures. Upon suspension, it is defined that the UE stores its used RRC configuration. In other words, if the UE is operating in any DC mode (and has an SCG configuration) or just having configured SCells in the MCG, it shall store all these configurations. However, upon resume, at least until Release 15, it is defined that the UE shall release the SCG configurations and SCell configurations, as shown below:

Given that it may be quite typical for a UE with burst traffic to be suspended and resumed in the same cell, 3GPP has standardized a solution in LTE to enable the UE to assist the network with measurements performed while the UE is in RRC_IDLE so that the network could speed up the setup of CA or DC.

IV. Existing Solution for Early Measurements Upon Idle to Connected Transition in LTE (Release 15)

In LTE Release 15, it may be possible to configure the UE to report so called early measurements upon the transition from the idle state to the connected state. These measurements are measurements that the UE can perform in the idle state in accordance with a configuration provided by the source cell. For example, the source cell may intend to receive these measurements immediately as soon as the UE gets connected to quickly setup CA and/or other forms of DC (e.g., EN-DC, MR-DC, etc.) without having to first provide a measurement configuration (measConfig) in RRC_CONNECTED and wait for hundreds of milliseconds until first samples are collected, monitored, and then the first reports are triggered and transmitted to the network.

A. Measurement Configuration for Early Measurements Upon Resume in LTE

A first aspect of the existing solution, as standardized in E-UTRA 36.331, is described in 5.6.20 Idle Mode Measurements. The UE can receive these idle mode measurement configurations in the system information (System Information Block 5 (SIB5)) in the field MeasIdleConfigSIB-r15, indicating up to 8 cells or ranges of cell IDs to perform

---

5.3.3.2 Initiation

The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.

...

Except for NB-IoT, upon initiating the procedure, if connected to EPC or 5GC, the UE shall:
  1> if the UE is resuming an RRC connection from a suspended RRC connection or from RRC_INACTIVE:
    2> if the UE is resuming an RRC connection from a suspended RRC connection:
      3> if the UE was configured with EN-DC:
        4> perform EN-DC release, as specified in TS 38.331 [82], clause 5.3.5.10;
    2> release the MCG SCell(s), if configured, in accordance with 5.3.10.3a;
    ...
    2> release the entire SCG configuration, if configured, except for the DRB configuration (as configured by drb-ToAddModListSCG);

---

Hence, when the UE resumes from RRC_IDLE in the RRC context, if the network decides to add SCell(s) to the MCG or add an SCG, the UE may need to go through the entire RRC procedure from scratch, even if the UE is suspending and resuming in the same cell/area where all the previous PCell and SCell configurations are still valid from a radio conditions perspective.

measurements on. In addition, the UE can be either configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

| RRCConnectionRelease message |
|---|
| ```
-- ASN1START
RRCConnectionRelease ::=            SEQUENCE {
    rrc-TransactionIdentifier           RRC-TransactionIdentifier,
    criticalExtensions                  CHOICE {
        c1                                  CHOICE {
            rreconnectionRelease-r8             RRCConnectionRelease-r8-IEs,
            spare3 NULL, spare2 NULL, spare1 NULL
        },
        criticalExtensionsFuture            SEQUENCE { }
    }
}
-- other info has been omitted
RRCConnectionRelease-v1530-IEs ::= SEQUENCE {
    drb-ContinueROHC-r15                ENUMERATED {true}       OPTIONAL,
    nextHopChainingCount-r15            NextHopChainingCount
OPTIONAL, -- Cond UP-EDT
    measIdleConfig-r15                  MeasIdleConfigDedicated-r15
OPTIONAL, -- Need ON
    rrc-InactiveConfig-r15              RRC-InactiveConfig-r15
OPTIONAL, -- Need OR
    cn-Type-r15                         ENUMERATED {epc,fivegc}
OPTIONAL, -- Need OR
    nonCriticalExtension                SEQUENCE { }            OPTIONAL
}
-- ASN1STOP
``` |

| MeasIdleConfig information element |
|---|
| ```
-- ASN1START
MeasIdleConfigSIB-r15 ::=           SEQUENCE {
    measIdleCarrierListEUTRA-r15        EUTRA-CarrierList-r15,
    ...
}
MeasIdleConfigDedicated-r15 ::=     SEQUENCE {
    measIdleCarrierListEUTRA-r15        EUTRA-CarrierList-r15
OPTIONAL, -- Need OR
    measIdleDuration-r15                ENUMERATED {sec10, sec30, sec60,
sec120,
                                            sec180, sec240, sec300, spare},
    ...
}
EUTRA-CarrierList-r15 ::=           SEQUENCE (SIZE (1..maxFreqIdle-r15)) OF
MeasIdleCarrierEUTRA-r15
MeasIdleCarrierEUTRA-r15::=             SEQUENCE {
    carrierFreq-r15                     ARFCN-ValueEUTRA-r9,
    allowedMeasBandwidth-r15            AllowedMeasBandwidth,
    validityArea-r15                    CellList-r15   OPTIONAL,
    measCellList-r15                    CellList-r15   OPTIONAL,
    reportQuantities                    ENUMERATED {rsrp, rsrq, both},
    qualityThreshold-r15                SEQUENCE {
        idleRSRP-Threshold-r15              RSRP-Range
OPTIONAL, -- Need OR
        idleRSRQ-Threshold-r15              RSRQ-Range-r13
OPTIONAL -- Need OR
    }                                       OPTIONAL, --
Need OR
    ...
}
CellList-r15 ::=                    SEQUENCE (SIZE (1.. maxCellMeasIdle-r15))
OF PhysCellIdRange
-- ASN1STOP
``` |

| MeasIdleConfig field descriptions |
|---| allowedMeasBandwidth
If absent, the value corresponding to the downlink bandwidth indicated by the dl-Bandwidth included in MasterInformationBlock of serving cell applies.
carrierFreq
Indicates the E-UTRA carrier frequency to be used for measurements during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec10 correspond to 10 seconds, value sec30 to 30 seconds and so on.
qualityThreshold Indicates the quality thresholds for reporting the measured cells for IDLE mode measurements.
reportQuantities
Indicates which measurement quantities UE is requested to report in the IDLE mode measurement report.
measCellList
Indicates the list of cells which the UE is requested to measure and report for IDLE mode measurements.
vaiidityArea
Indicates the list of cells within which UE is requested to do IDLE mode measurements. If the UE reselects to a cell outside this list, the measurements are no longer required.

Carrier Information and Cell List

The UE is provided with a list of carriers and optionally with a list of cells that the UE shall perform measurements. The s-NonIntraSearch field in SystemInformationBlock-Type3 does not affect the UE measurement procedures in IDLE mode.

Timer T331

Upon reception of that measurement configuration, the UE starts a timer T331 with the value provided in measIdle-Duration, which can go from 0 to 300 seconds. The timer stops upon receiving RRCConnectionSetup or RRCConnectionResume configured to indicate a transition to RRC_CONNECTED. As such, it may be possible to limit the amount of time the UE perform measurements for that purpose of early measurements.

Validity Area

Another concept introduced in the LTE Release 15 solution is a validity area, which comprises a list of Physical Cell Identifications (PCTs). The intention is to limit the area where CA or DC may be setup later when the UE resumes/setups the connection, so the early measurements are somewhat useful for that purpose. If validityArea is configured, and the UE reselects to a serving cell having a PCI does not match any entry in validityArea for the corresponding carrier frequency, the timer T331 is stopped. Then, the UE stops to perform IDLE measurements and releases the configuration (i.e., VarMeasIdleConfig). Notice that this does not necessarily imply that the UE releases the idle measurements that were configured in Release 15 and that were performed. For example, the idle measurements can still be stored and possibly requested by the network. In addition, the UE may continue with IDLE mode measurements according to the broadcasted SIB5 configuration after the timer T331 has expired or stopped.

Minimum Quality Threshold

Notice also that a cell(s) measured during the idle mode can only be stored as a cell candidate(s) for CA when the idle measurements for the cell(s) are above a certain threshold. How the UE performs measurements in IDLE mode is up to UE implementation as long as RAN4 requirements for measurement reporting defined in 36.133 are met. The UE behavior is shown below in more detail as described in 36.331.

---

5.6.20 Idle Mode Measurements
5.6.20.1 General
This procedure specifies the measurements done by a UE in RRC_IDLE when it has an IDLE mode measurement configuration and the storage of the available measurements by a UE in both RRC_IDLE and RRC_CONNECTED.
5.6.20.2 Initiation
While T331 is running, the UE shall:
    1> perform the measurements in accordance with the following:
        2> for each entry in measIdleCarrierListEUTRA within VarMeasIdleConfig:
            3> if UE supports carrier aggregation between serving carrier and the carrier frequency
                and bandwidth indicated by carrierFreq and allowedMeasBandwidth within the
                corresponding entry;
                4> perform measurements in the carrier frequency and bandwidth indicated by
                    carrierFreq and allowedMeasBandwidth within the corresponding entry;
                NOTE: The fields s-NonIntraSearch in SystemInformationBlockType3 do not affect
                the UE measurement procedures in IDLE mode. How the UE performs measurements
                in IDLE mode is up to UE implementation as long as the requirements in TS 36.133
                [16] are met for measurement reporting. UE is not required to perform idle
                measurements if SIB2 idle measurement indication is not configured.
            4> if the measCellFist is included:
                5> consider PCell and cells identified by each entry within the measCellFist to be
                    applicable for idle mode measurement reporting;
            4> else:
                5> consider PCell and up to maxCellMeasIdle strongest identified cells whose
                    RSRP/RSRQ measurement results are above the value(s) provided in
                    qualityThreshold (if any) to be applicable for idle mode measurement
                    reporting;
            4> store measurement results for cells applicable for idle mode measurement
              reporting within the VarMeasIdleReport;

```
        3>  else:
            4>  do not consider the carrier frequency to be applicable for idle mode measurement
                reporting;
    1>  if validityArea is configured in VarMeasIdleConfig and UE reselects to a serving cell
        whose physical cell identity does not match any entry in validityArea for the corresponding
        carrier frequency:
        2>  stop T331;
5.6.20.3  T331 expiry or stop
The UE shall:
    1>  if T331 expires or is stopped:
        2>  release the VarMeasIdleConfig;
NOTE: It is up to UE implementation whether to continue IDLE mode measurements according
to SIB5 configuration after T331 has expired or stopped.
```

B. Indication of Available Early Measurements Upon Resume/Setup in LTE

Another aspect of the existing solution occurs when the UE tries to resume or setup a call from RRC_IDLE without context. If the previous step is performed (e.g., the UE is configured to store idle measurements), the network may request the UE after resume/setup (after security is activated) whether the UE has idle measurements available.

In the case this UE is setting up a connection coming from RRC_IDLE without the AS Context, the network is not aware that the UE has available measurements stored. In this regard, the network may request the UE to report early measurements and the UE may indicate the availability of stored idle measurements in RRCConnectionSetupComplete. As not all cells would support the feature anyway, the UE only includes that availability information if the cell broadcasts the idleModeMeasurements indication in SIB2. The flag in RRCReconnectionSetupComplete and procedure text are shown below:

```
RRCConnectionSetupComplete-v1530-IEs ::= SEQUENCE {
    logMeasAvailableBT-r15          ENUMERATED {true}
        OPTIONAL,
    logMeasAvailableWLAN-r15        ENUMERATED {true}
        OPTIONAL,
    idleMeasAvailable-r15           ENUMERATED {true}
        OPTIONAL,
    flightPathInfoAvailable-r15     ENUMERATED {true}
        OPTIONAL,
    connectTo5GC-r15                ENUMERATED {true}
        OPTIONAL,
    registeredAMF-r15               RegisteredAMF-r15                   OPTIONAL,
    s-NSSAI-list-r15                SEQUENCE(SIZE (1..maxNrofS-NSSAI-r15)) OF S-
NSSAI-r15 OPTIONAL,
    ng-5G-S-TMSI-Bits-r15           CHOICE {
        ng-5G-S-TMSI-r15                NG-5G-S-TMSI-r15,
        ng-5G-S-TMSI-Part2-r15          BIT STRING (SIZE (8))
    }                                                                   OPTIONAL,
    nonCriticalExtension            RRCConnectionSetupComplete-v1540-IEs    OPTIONAL
}

5.3.3.4  Reception of the RRCConnectionSetup by the UE
            NOTE 1: Prior to this, lower layer signalling is used to allocate a C-RNTI. For
                further details see TS 36.321 [6];
The UE shall:
    1>  if the RRCConnectionSetup is received in response to an RRCConnectionResumeRequest
        from a suspended RRC connection:
        . . .
    1>  set the content of RRCConnectionSetupComplete message as follows:
        2>  if the RRCConnectionSetup is received in response to an
            RRCConnectionResumeRequest:
            . . .
            2>  if the UE is connected to EPC:
                3>  except for NB-IoT:
                    . . .
                    4>  if the SIB2 contains idleModeMeasurements, and the UE has IDLE mode
                        measurement information available in VarMeasIdleReport:
                        5>  include the idleMeasAvailable;
                    4>  stop T331 (if running);
                    . . .
                3>  for NB-IoT:
                    4>  if the UE supports serving cell idle mode measurements reporting and
                        servingCellMeasInfo is present in SystemInformationBlockType2-NB:
                        5>  set the measResultServCell to include the measurements of the serving cell;
```

NOTE 2: The UE includes the latest results of the serving cell measurements as used for cell selection/ reselection evaluation, which are performed in accordance with the performance requirements as specified in TS 36.133 [16].
3> include dcn-ID if a DCN-ID value (see TS 23.401 [41]) is received from upper layers;

Another aspect of the existing solution occurs when the UE tries to resume or setup a call from RRC_IDLE without context. If the previous step is performed (e.g., the UE is configured to store idle measurements), the network may request the UE after resume/setup (after security is activated) whether the UE has idle measurements available.

In the case this UE is setting up a connection coming from RRC_IDLE without the AS Context, the network is not aware that the UE has available measurements stored. In this regard, the network may request the UE to report early measurements and the UE may indicate the availability of stored idle measurements in RRCConnectionSetupComplete. Since not all cells would support the feature, the UE only includes the availability information if the cell broadcasts the idleModeMeasurements indication in SIB2. The flag in RRCReconnectionSetupComplete and procedure text are shown below:

```
RRCConnectionResumeComplete-v1530-IEs ::= SEQUENCE {
    logMeasAvailableBT-r15        ENUMERATED {true}
        OPTIONAL,
    logMeasAvailableWLAN-r15      ENUMERATED {true}
        OPTIONAL,
    idleMeasAvailable-r15         ENUMERATED {true}
        OPTIONAL,
    flightPathInfoAvailable-r15   ENUMERATED {true}          OPTIONAL,
    nonCriticalExtension          SEQUENCE {}                OPTIONAL
}

5.3.3.4a  Reception of the RRCConnectionResume by the UE
The UE shall:
    ...
    1>  set the content of RRCConnectionResumeComplete message as follows:
        2>  except for NB-IoT:
            ...
            3>  if the SIB2 contains idleModeMeasurements, and the UE has IDLE mode
                measurement information available in VarMeasIdleReport:
                4>  include the idleMeasAvailable;
            3>  stop T331 (if running);
        2>  for NB-IoT:
            3>  if the UE supports serving cell idle mode measurements reporting and
                servingCellMeasInfo is present in SystemInformationBlockType2-NB:
                4>  set the measResultServCell to include the measurements of the serving cell;
                NOTE: The UE includes the latest results of the serving cell measurements as used
                for cell selection/ reselection evaluation, which are performed in accordance with the
                performance requirements as specified in TS 36.133 [16].
    1>  submit the RRCConnectionResumeComplete message to lower layers for transmission;
    1>  the procedure ends.
```

C. Reporting of Early Measurements Upon Resume/Setup in LTE

Once the UE indicates to the target cell (e.g., upon resume or setup) that idle measurements are available, the network may request the UE to report these idle measurements by including the field idleModeMeasurementReq in the UEInformationRequest message transmitted to the UE. Then, as illustrated in FIG. 6, the UE responds with a UEInformationResponse containing the previously stored idle measurements.

```
5.6.5.3   Reception of the UEInformationRequest message

Upon receiving the UEInformationRequest message, the UE shall, only after successful security
activation:

...

1>  if the idleModeMeasurementReq is included in the UEInformationRequest and UE has stored
    VarMeasIdleReport:
    2>  set the measResultListIdle in the UEInformationResponse message to the value of
        idleMeasReport in the VarMeasIdleReport;
```

-continued

2> discard the VarMeasIdleReport upon successful delivery of the UEInformationResponse
   message confirmed by lower layers;
...

| UEInformationResponse message |
|---|
| -- ASN1START<br>UEInformationResponse-r9 ::=          SEQUENCE {<br>   rrc-TransactionIdentifier          RRC-TransactionIdentifier,<br>   criticalExtensions                 CHOICE {<br>     c1                               CHOICE {<br>       ueInformationResponse-r9             UEInformationResponse-r9-IEs,<br>       spare3 NULL, spare2 NULL, spare1 NULL<br>     },<br>     criticalExtensionsFuture         SEQUENCE { }<br>   }<br>}<br>UEInformationResponse-v1530-IEs ::= SEQUENCE {<br>   measResultListIdle-r15            MeasResultListIdle-r15<br>   OPTIONAL,<br>   flightPathInfoReport-r15          FlightPathInfoReport-r15<br>   OPTIONAL, nonCriticalExtension    SEQUENCE { }<br>} |

V. Problems with Existing Solutions

There currently exist certain challenge(s). The existing solutions for reporting early measurements from a UE to a network node are primarily related to reporting early measurements when the UE transitions from an idle state (e.g., RCC_IDLE) to a connected state (e.g., RCC_CONNECTED). However, the existing 3GPP solutions do not explicitly define how the UE should report early measurements when transitioning from the dormant state to the connected state.

SUMMARY

Embodiments disclosed herein are related to methods for reporting quantized early measurements to a network node (e.g., base station). In examples disclosed herein, a wireless device (e.g., User Equipment (UE)) may perform an early measurement(s) during a dormant state. When the wireless device transitions from the dormant state to a connected state, the wireless device quantizes the early measurements and reports at least a subset of the quantized early measurements to the network node. By quantizing the early measurements, it may be possible to generate an early measurement report with reduced size, thus making it possible to include or multiplex the early measurement report in an uplink message with limited transport blocks (e.g., Radio Resource Control (RRC) Resume Request and RRC Setup Request). As a result, the network node may expedite connection setup for Carrier Aggregation (CA) and Dual Connectivity (DC). In addition, it may be possible to protect the early measurement report before security activation.

In one embodiment, a method performed by a wireless device for reporting quantized early measurements to a network node is provided. The method includes, when the wireless device is transitioning from a dormant state to a connected state, transmitting an RRC resume request like message or an RRC setup request like message to a network node. The method also includes, when the wireless device is transitioning from a dormant state to a connected state, transmitting a report of one or more quantized early measurements to the network node.

In another embodiment, a wireless device for reporting quantized early measurements to a network node is provided. When a wireless device is transitioning from a dormant state to a connected state, the wireless device is adapted to transmit an RRC resume request like message or an RRC setup request like message to a network node. When the wireless device is transitioning from a dormant state to a connected state, the wireless device is adapted to transmit a report of one or more quantized early measurements to the network node.

In another embodiment, a method performed by a network node is provided. The method includes, when a wireless device is transitioning from a dormant state to a connected state, receiving an RRC resume request like message or an RRC setup request like message from the wireless device. The method also includes, when the wireless device is transitioning from a dormant state to a connected state, receiving a report of one or more quantized early measurements.

In another embodiment, a network node for a cellular communications network is provided. When a wireless device is transitioning from a dormant state to a connected state, the network node is adapted to receive a RRC resume request like message or an RRC setup request like message from the wireless device. When the wireless device is transitioning from a dormant state to a connected state, the network node is adapted to receive a report of one or more quantized early measurements from the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
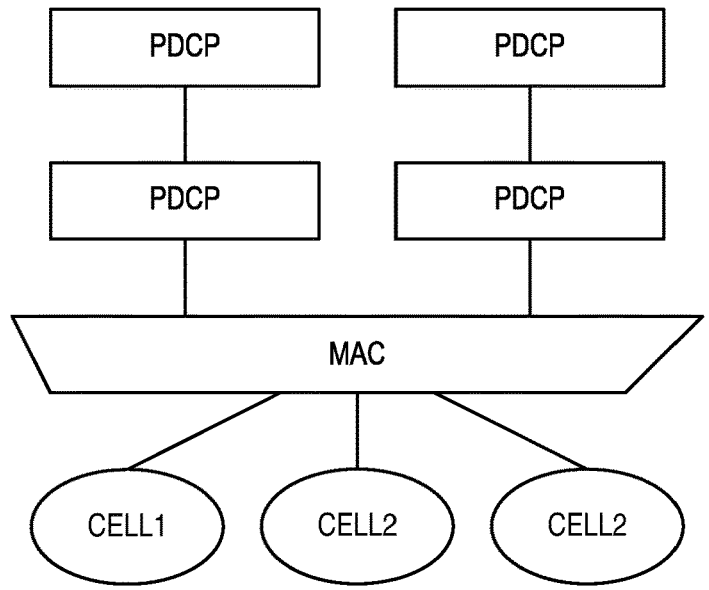
FIG. 1 is a schematic diagram providing an exemplary illustration of multiple cells in a wireless communications network, which are aggregated on a Medium Access Control (MAC) level.
Figure 2:
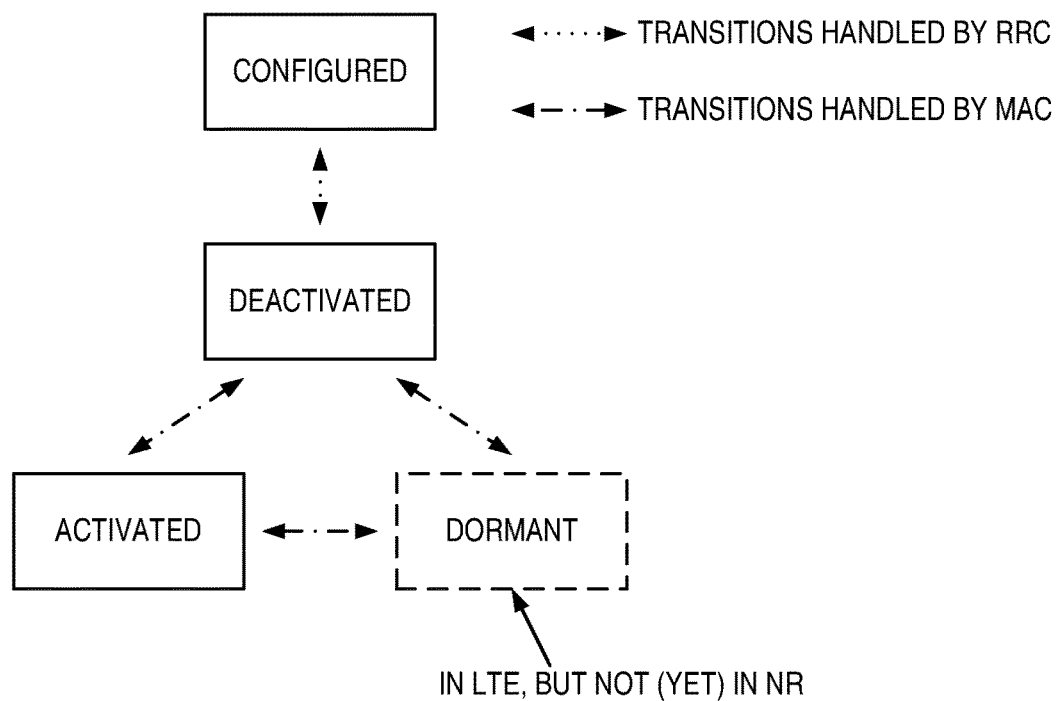
FIG. 2 is a schematic diagram providing an exemplary illustration of state transitions as controlled by a MAC Control Element (CE)
Figure 3:
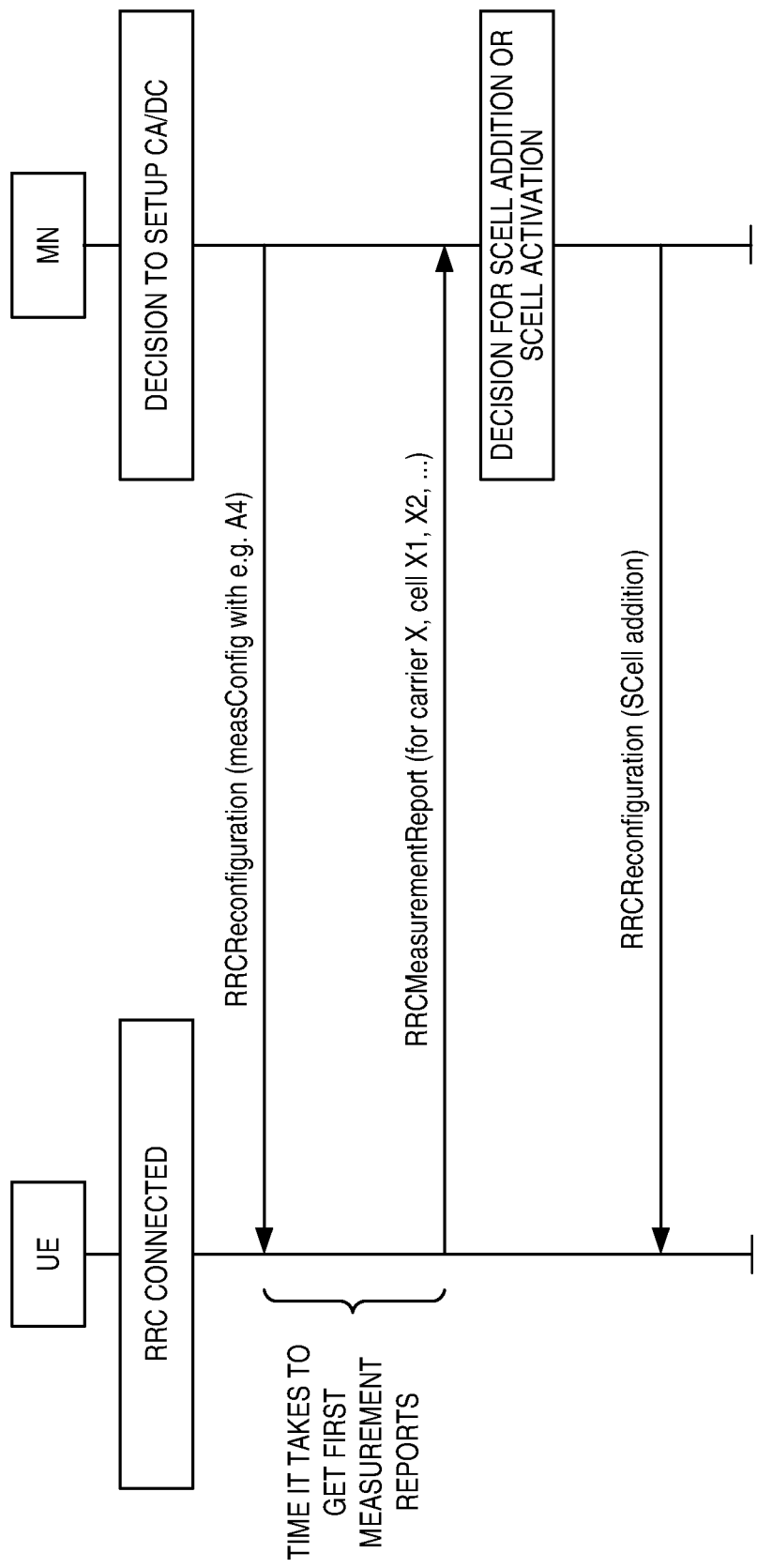
FIG. 3 illustrates an exemplary signal flow whereby a network node can configure a User Equipment (UE) to set up Carrier Aggregation (CA) or Dual Connectivity (DC)
Figure 4:
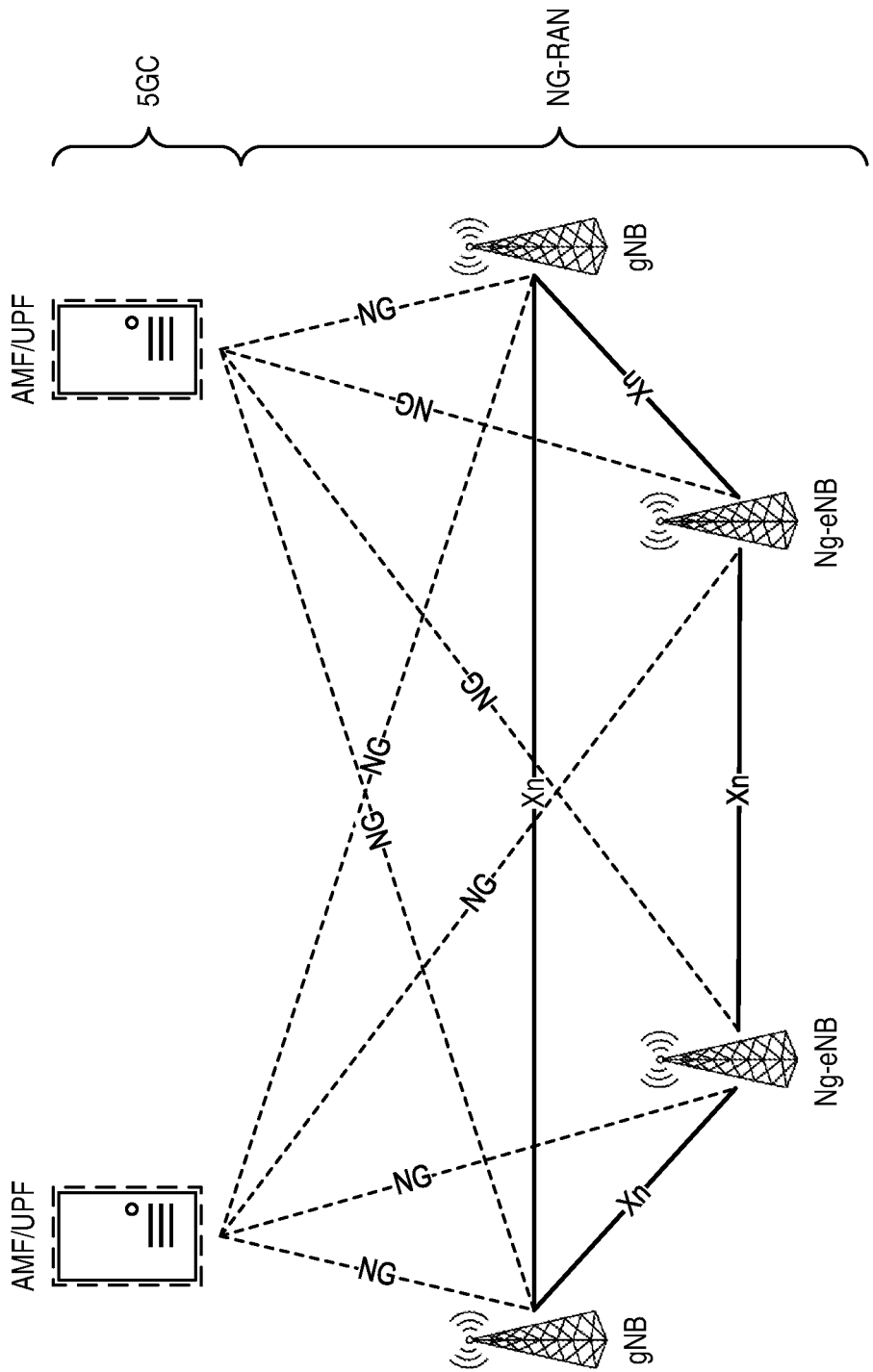
FIG. 4 is a schematic diagram providing an exemplary illustration of connections between different network nodes in a Fifth Generation (5G) Core (5GC)
Figure 5:
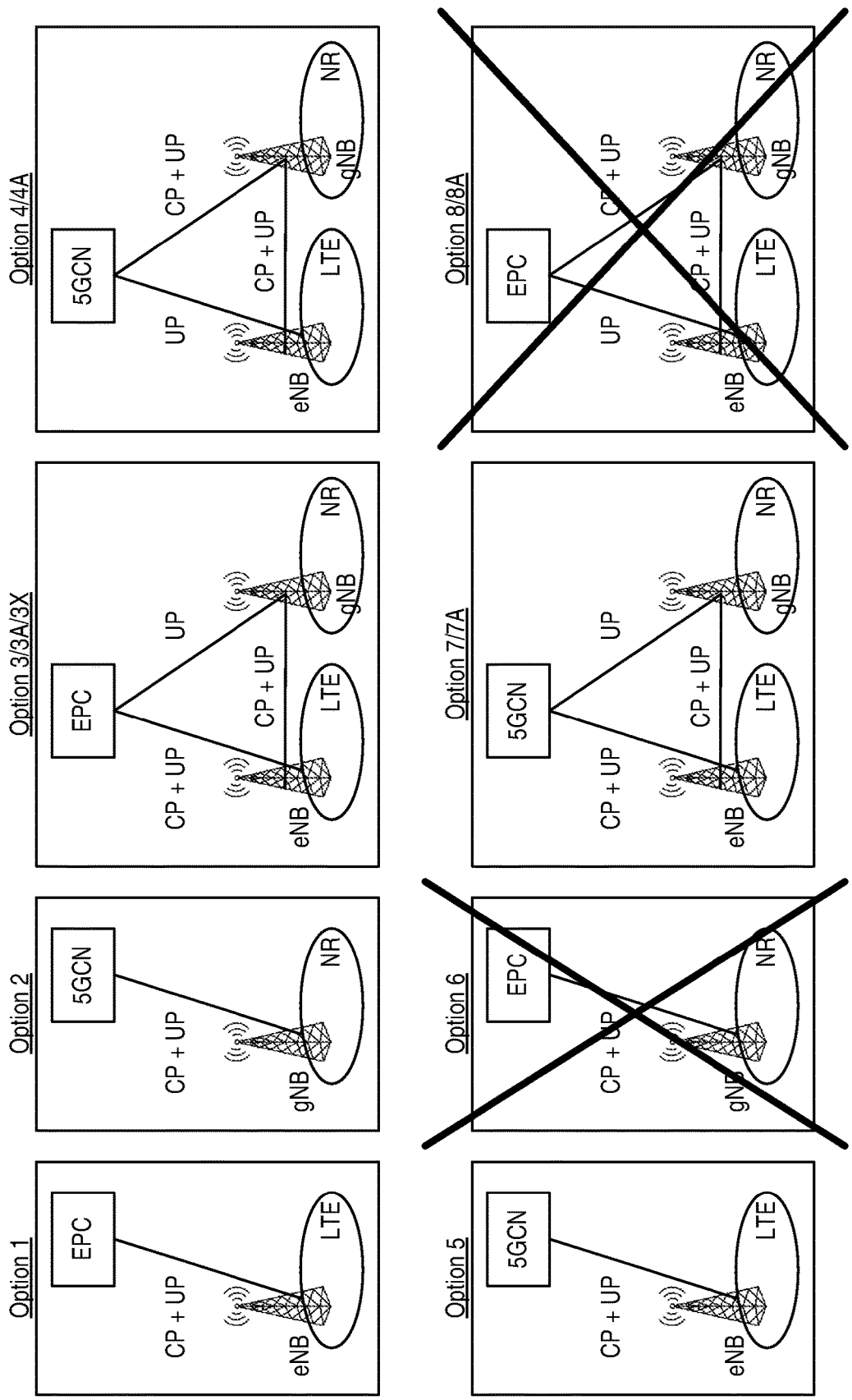
FIG. 5 illustrates schematic diagrams providing exemplary illustrations of various internetworking options between Long Term Evolution (LTE) and 5G New Radio (NR) network nodes.
Figure 6:
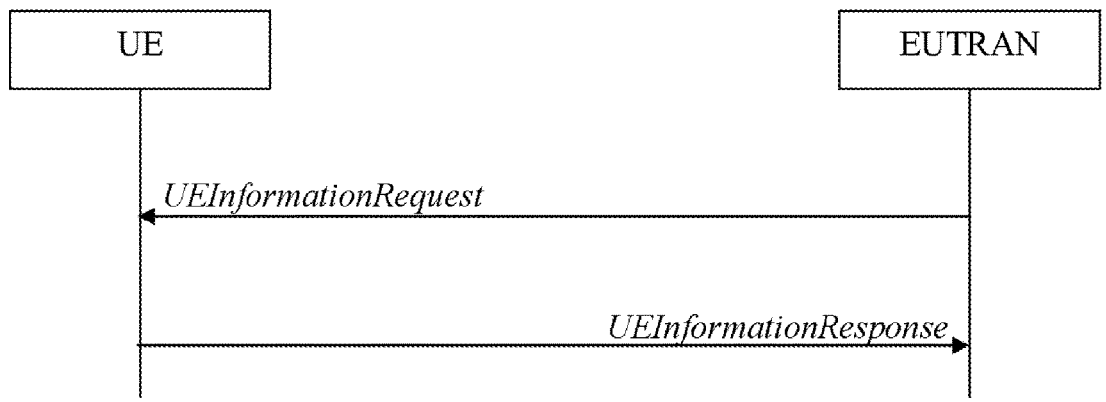
FIG. 6 illustrates an exemplary signal flow for reporting early measurements in LTE.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) related to early measurement reporting. The problem addressed in the present disclosure is how to provide information about measurement results during transitions from dormant state to connected state as soon as possible, so the network may quickly setup Carrier Aggregation (CA) and/or Dual Connection (DC) (which may include Evolved Universal Terrestrial Radio Access (E-UTRA) NR DC (EN-DC)). This problem has been addressed to some extent is U.S. Provisional Application Ser. Nos. 62/804,603, 62/804,612, and 62/821,184.

Figure 7:
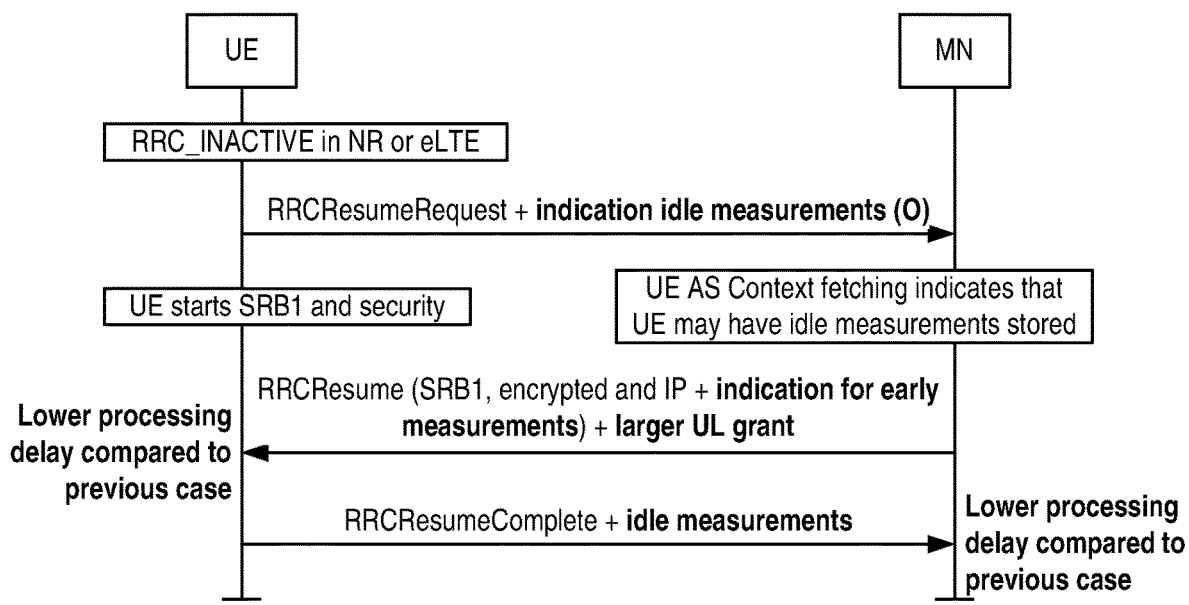
FIG. 7 provides an exemplary signal flow for the UE to report the early measurements in msg5 (e.g., RRCResumeComplete) when transitioning from a dormant state to a connected state.

In U.S. Provisional Application Ser. No. 62/804,603, it has been proposed that early measurements may be communicated either inside msg5 (e.g., RRCResumeComplete) or multiplexed together with msg5 (e.g., RRCResumeComplete) in the case of resuming a suspended connection, an example realization of which is illustrated in FIG. 7.

Figure 8:
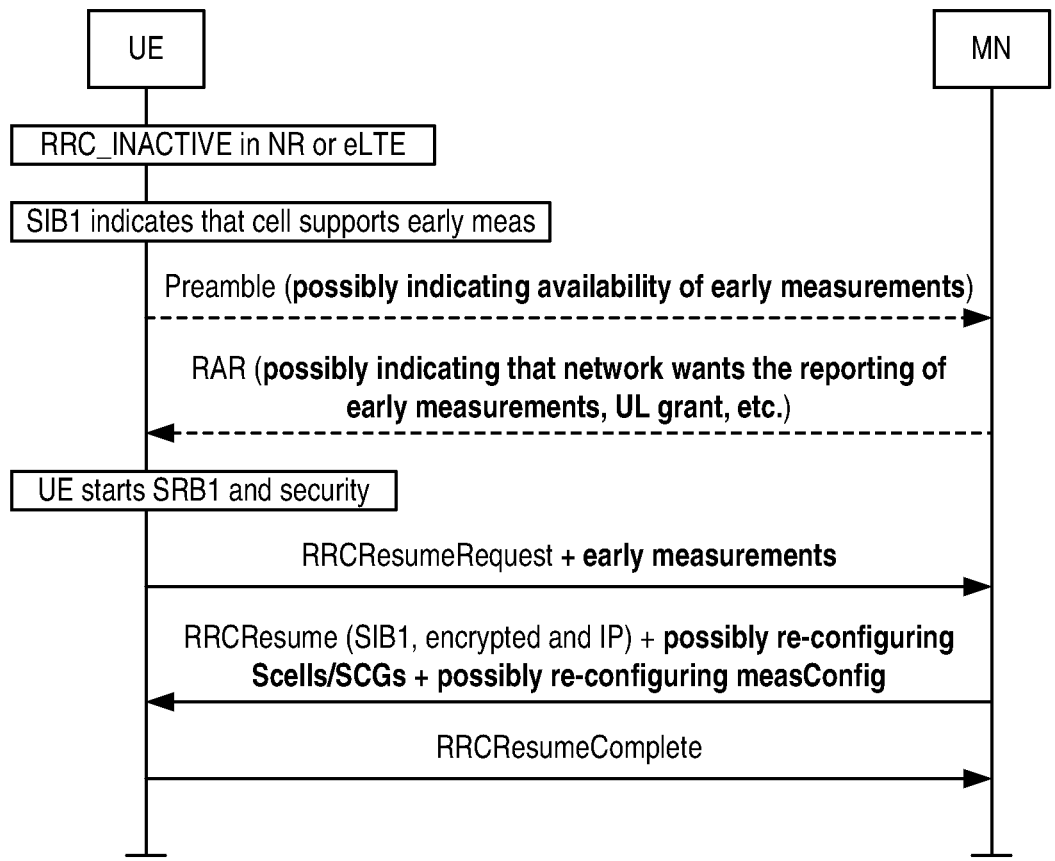
FIG. 8 provides an exemplary signal flow for the UE to report the early measurements in msg3 (e.g., RRCResumeRequest) when transitioning from the dormant state to the connected state.

In U.S. Provisional Application Ser. No. 62/804,612, it has been proposed that early measurements may be communicated either inside msg3 (e.g., RRCResumeRequest) or multiplexed with msg3 (e.g., RRCResumeRequest) in the case of resuming a suspended connection, an example realization of which is illustrated in FIG. 8.

Sending the early measurements with msg5 (e.g., RRCResumeComplete) as compared to the LTE enhancing utilization of CA (euCA) solution of sending the early measurements as a response a UEInformationRequest from the network may save at least one Round Trip Time (RTT) in setting up of CA/DC based on the early measurements. Sending the early measurements multiplexed with msg3 (e.g., RRCResumeRequest) may enable an even faster CA/DC setup based on the early measurements because the early measurements can be used to configure CA/DC already in the RRCResume command (e.g., no further Radio Resource Control (RRC) Reconfiguration is required).

Thus, from performance point of view, the msg3 solution (e.g., measurements multiplexed with RRCResumeRequest) may enable the network to obtain measurements faster than via msg5 (e.g., measurements with RRCResumeComplete). However, because msg3 is the first scheduled message on Physical Uplink Shared Channel (PUSCH) and channel conditions at the time may be largely unknown, it requires the UE to transmit msg3 as robust as possible. In this regard, the msg3 can only include a limited number of Transport Blocks (TBs), which may be limited by the number of bits that can be reliably delivered to the UE at the cell edge. In this regard, it may be desired it may be desirable for the UE to determine what early measurements to be included in the early measurement report such that the early measurement report can be transmitted to the network with the limited number of TBs.

Certain aspects of the present disclosure and their embodiments may provide solutions to the aforementioned or other challenges. In aspects disclosed herein, a quantized method for reporting idle/inactive measurement results is provided. By reporting idle/inactive measurement results in a quantized fashion, it may be possible to reduce the size of the early measurement report. As such, it may be possible to fit the early measurement report either inside a msg3 or multiplex the early measurement with a msg3, thus helping to avoid such security concerns as not being able to protect the early measurement report before security activation. For instance, when reporting from RRC_IDLE, the quantized measurements may be included or multiplexed with RRC Setup Request. As such, it may be able to protect the content of the measurements even though security is not activated at that time.

In some embodiments, reporting the status/quality of the configured serving cells during connection resumption is provided. In some embodiments, reporting the status/quality of the best configured frequencies/cells to be measured during idle/inactive mode during connection resumption or establishment, in a quantized manner that can fit in with msg3 transmission, is provided.

Certain embodiments may provide one or more of the following technical advantage(s). Embodiments of the present disclosure enable the reporting of idle/inactive measurement results in a quantized way so that they can be included within the limited msg3 and also avoid the security limitation of not being able to send measurements before security activation.

For instance, when establishing a connection from IDLE mode, currently it is not possible to send measurements because security is not activated. Sending measurements without security could lead to security/privacy issues as the measurement results (which includes cell information and quality of the radio link from the UE to these cells) can be used to track/locate the UE. By sending a quantized measurement report that doesn't reveal the exact quality and/or cell information, such a behavior from an intruder/sniffer can be prevented.

Figure 9:
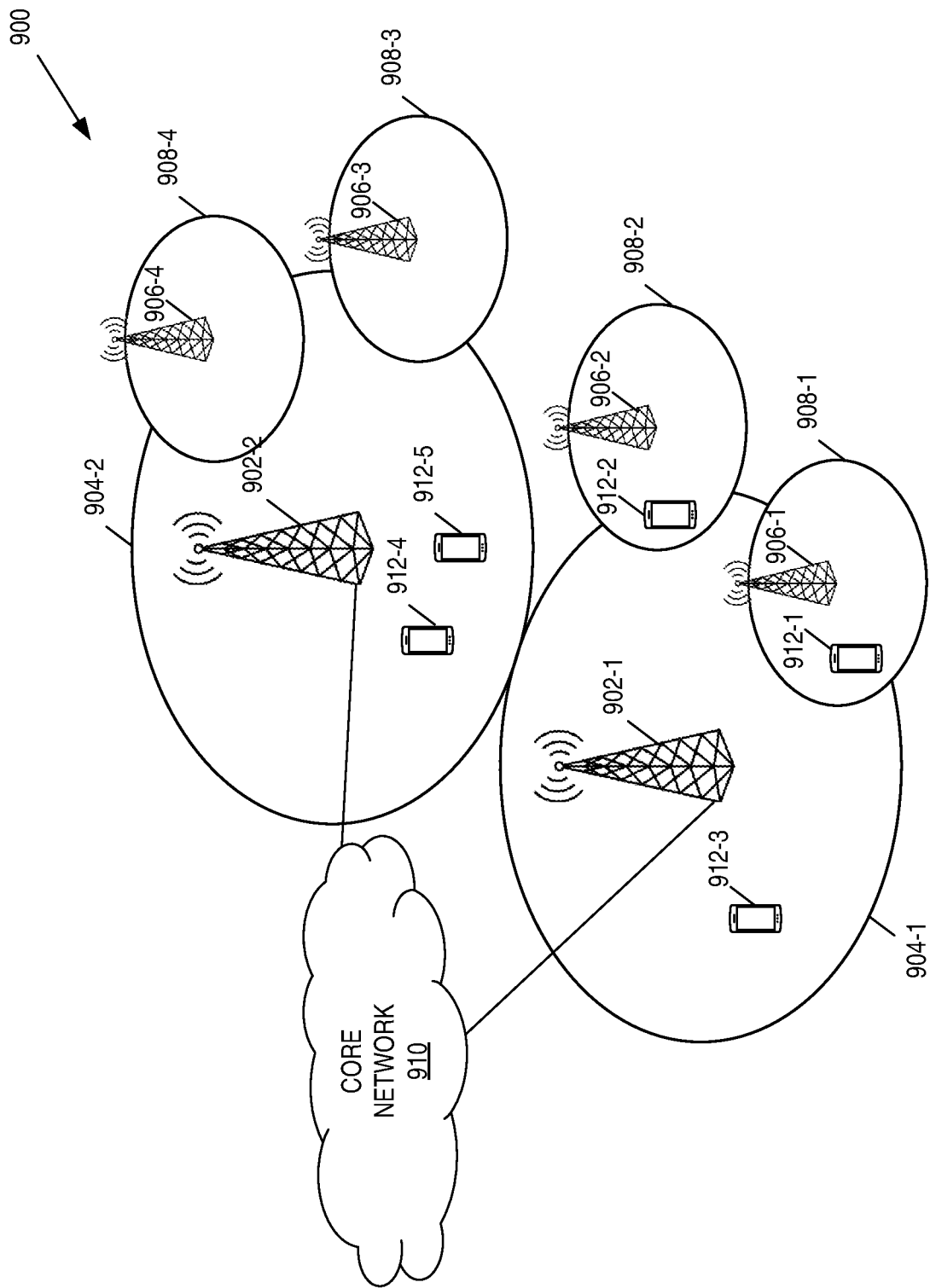
FIG. 9 illustrates one example of a wireless communications network in which embodiments of the present disclosure may be implemented.

FIG. 9 illustrates one example of a cellular communications network 900 in which embodiments of the present disclosure may be implemented. In the embodiments described herein, the cellular communications network 900 is a 5G NR network. In this example, the cellular communications network 900 includes base stations 902-1 and 902-2, which in LTE are referred to as eNBs and in 5G NR are referred to as gNBs, controlling corresponding macro cells 904-1 and 904-2. The base stations 902-1 and 902-2 are generally referred to herein collectively as base stations 902 and individually as base station 902. Likewise, the macro cells 904-1 and 904-2 are generally referred to herein collectively as macro cells 904 and individually as macro cell 904. The cellular communications network 900 may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The base stations 902 (and optionally the low power nodes 906) are connected to a core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

Now, a description of some example embodiments of the present disclosure will be provided. The idle/inactive mode measurements are reported to the network in a quantized manner, meaning that only a subset of the measurement results are reported with less granularity, in order to fit the results (i.e., the quantized early measurement report) in the size limited msg3 during connection establishment or resumption.

In all subsequent embodiments, the early measurements can be based on different configured thresholds of Reference Signal Received Power (RSRP), Reference Signal Received Quality (RSRQ), and/or Signal-to-Interference-plus-Noise Ratio (SINR). Also, the early measurement quantity may be based on Synchronization Signal Block (SSB) and/or Channel State Information Reference Signal (CSI-RS). Cell level and/or beam level results may also be considered in the early measurements.

In the following descriptions, the term "dormant state" is used to cover RRC_IDLE in NR and LTE, RRC_IDLE with suspended in LTE, and RRC_INACTIVE in NR and LTE. The terms may be used interchangeably, where an example using one of the cases may also apply to the other cases. Hereinafter, the phrase "RRC Resume Request like message" refers in general to "RRCResumeRequest" and "RRCResumeRequest1" in NR, as well as "RRCConnectionResumeRequest" in LTE. Hereinafter, the phrase "RRC Setup Request like message" refers in general to "RRCSetupRequest" in NR and "RRCConnectionSetupRequest" in LTE. Hereinafter, the phrase "RRC Release Message like message" refers in general to "RRCRelease" in NR and "RRCConnectionRelease" in LTE.

Although the examples discussed herein are focused the resume case (e.g., RRC Resume Request), it should be appreciated that the methods are equally applicable to other type of connection establishment messages (e.g., RRC Setup Request and RRC Connection Setup) given that the quantized information (e.g., the early measurement report) does not pose a security risk and thus can be sent even without security activation.

The behavior of the UE, such as what information to include in the RRC Resume Request like message, whether to include quantized early measurements or not, and what type of quantized early measurements (e.g., cell and/or frequency related information) to include, can either be configured by the network (e.g., via RRC Release like message or system information) or as specified in the standards.

For the embodiments related to the usage of multiple bit indications, there can be several sub variants. For example, instead of using 16 bits to describe the suitability of 16 frequency layers, it may be possible to have 2 bits for each frequency and only report 8 frequency layers (e.g., where the 2 bits can be used to indicate high quality, medium quality, low quality, unsuitable).

The examples are based on the current restriction of having Uplink Common Control Channel (UL-CCCH) channels that limits the size of msg3 to 64 bits. In the future, if channels of higher size are introduced, more granular information may be provided (e.g., more frequencies/cells, more detailed information per frequency/cells). Also, information such as beam level results and/or CSI-RS based measurement could also be considered.

Indication Related to Previous Master Cell Group (MCG) and Secondary Cell Group (SCG) Serving Cells 1. Single Bit Indication to Restore Previous Configurations In one embodiment, when a UE transitions from a dormant state to a connected state, the UE includes a single-bit flag in the RRC Resume Request like message. Note that the term "RRC Resume Request like message" is a general term that refers to, e.g., an RRCResumeRequest message or an RRCConnectionResumeRequest message. The single-bit flag may be configured to indicate that:
- all previous MCG Secondary Cells (SCells) the UE was configured with are above/below a threshold; or
- the previous Primary Secondary Cell (PSCell) (for DC) is above/below a threshold; or
- all previous serving cells in the SCG (PSCell and SCell(s)) are above/below a threshold; or
- all previous MCG SCell(s) and all previous SCG serving cells (PSCell and SCell(s)) are above/below a threshold.

The threshold can be configured either in the RRC Release Message or in a System Information Block (SIB), and the threshold can be different for different cell/cell groups/beams (e.g., one threshold for PSCell another for SCell(s)) or there can be a single threshold for all. What the indication refers to (e.g., all MCG SCells, PSCell, etc.) is either defined in the specifications or signaled by the network in broadcast (e.g., via SIB) or dedicated signaling (e.g., RRC Release like messages).

In one possible example, the UE may include the single-bit indication inside the RRCResumeRequest/RRCConnectionResumeRequest by using the spare bit to indicate the quality of all cells previous MCG SCell(s):

| RRCResumeRequest message | |
|---|---|
| -- ASN1START | |
| -- TAG-RRCRESUMEREQUEST-START | |
| RRCResumeRequest ::= | SEQUENCE { |
|     rrcResumeRequest | RRCResumeRequest-IEs |
| } | |
| RRCResumeRequest-IEs ::= | SEQUENCE { |
|     resumeIdentity | ShortI-RNTI-Value, |
|     resumeMAC-I | BIT STRING (SIZE (16)), |
|     resumeCause | ResumeCause, |
|     storedMCG-SCells | ENUMERATED {good} |
|     OPTIONAL, ~~spare~~ | ~~BIT STRING (SIZE (1))~~ |
| } | |
| -- TAG-RRCRESUMEREQUEST-STOP | |
| -- ASN1STOP | |

| RRCConnectionResumeRequest message | |
|---|---|
| -- ASN1START | |
| RRCConnectionResumeRequest-r13 ::= | SEQUENCE { |
|     criticalExtensions | CHOICE { |
|         rrcConnectionResumeRequest-r13 | |
|         RRCConnectionResumeRequest-r13-IEs, | |
|         rrcConnectionResumeRequest-r15 | |
|         RRCConnectionResumeRequest-5GC-r15-IEs | |

```
            }
        }
        RRCConnectionResumeRequest-r13-IEs ::=            SEQUENCE {
            resumeIdentity-r13                              CHOICE {
                resumeID-r13                                  ResumeIdentity-r13,
                truncatedResumeID-r13                          BIT STRING (SIZE (24))
            },
            shortResumeMAC-I-r13                            BIT STRING (SIZE (16)),
            resumeCause-r13                                 ResumeCause,
            storedMCG-SCells                                ENUMERATE{good}
            OPTIONAL spare                                   BIT STRING (SIZE (1))
        }
        RRCConnectionResumeRequest-5GC-r15-IEs ::=         SEQUENCE {
            resumeIdentity-r15                              CHOICE {
                fullI-RNTI-r15                                I-RNTI-r15,
                shortI-RNTI-r15                               ShortI-RNTI-r15
            },
            shortResumeMAC-I-r15                            BIT STRING (SIZE (16)),
            resumeCause-r15                                 ResumeCause-r15,
            storedMCG-SCells                                ENUMERATED {good}
            OPTIONAL spare                                   BIT STRING (SIZE (1))
        }
        ResumeCause ::=                                   ENUMERATED {
                                                              emergency, highPriorityAccess, mt-Access,
        mo-Signalling,
                                                              mo-Data, delayTolerantAccess-v1020, mo-
        VoiceCall-v1280, spare1
        }
        ResumeCause-r15 ::=                               ENUMERATED {
                                                              emergency, highPriorityAccess, mt-Access,
        mo-Signalling,
                                                              mo-Data, rna-Update, mo-VoiceCall, spare1
        }
        -- ASN1STOP
```

Alternatively, the UE can signal the single-bit indication in a separate RRC message, via Medium Access Control (MAC) Control Elements (CEs) or Downlink Control Information (DCI) signaling or using a dedicated Random Access Channel (RACH) preamble during the random access before sending the RRC Resume Request like message.

If the UE includes the single-bit indication, either in the RRCResumeRequest/RRCConnectionResumeRequest, or multiplexed together with the RRC message, or using a MAC CE/DCI signaling, or RACH preamble, the network can decide to release the configurations, configure the UE with the same configurations the UE had before the UE was suspended, or use delta configurations to restore the stored configurations.

Figure 10:
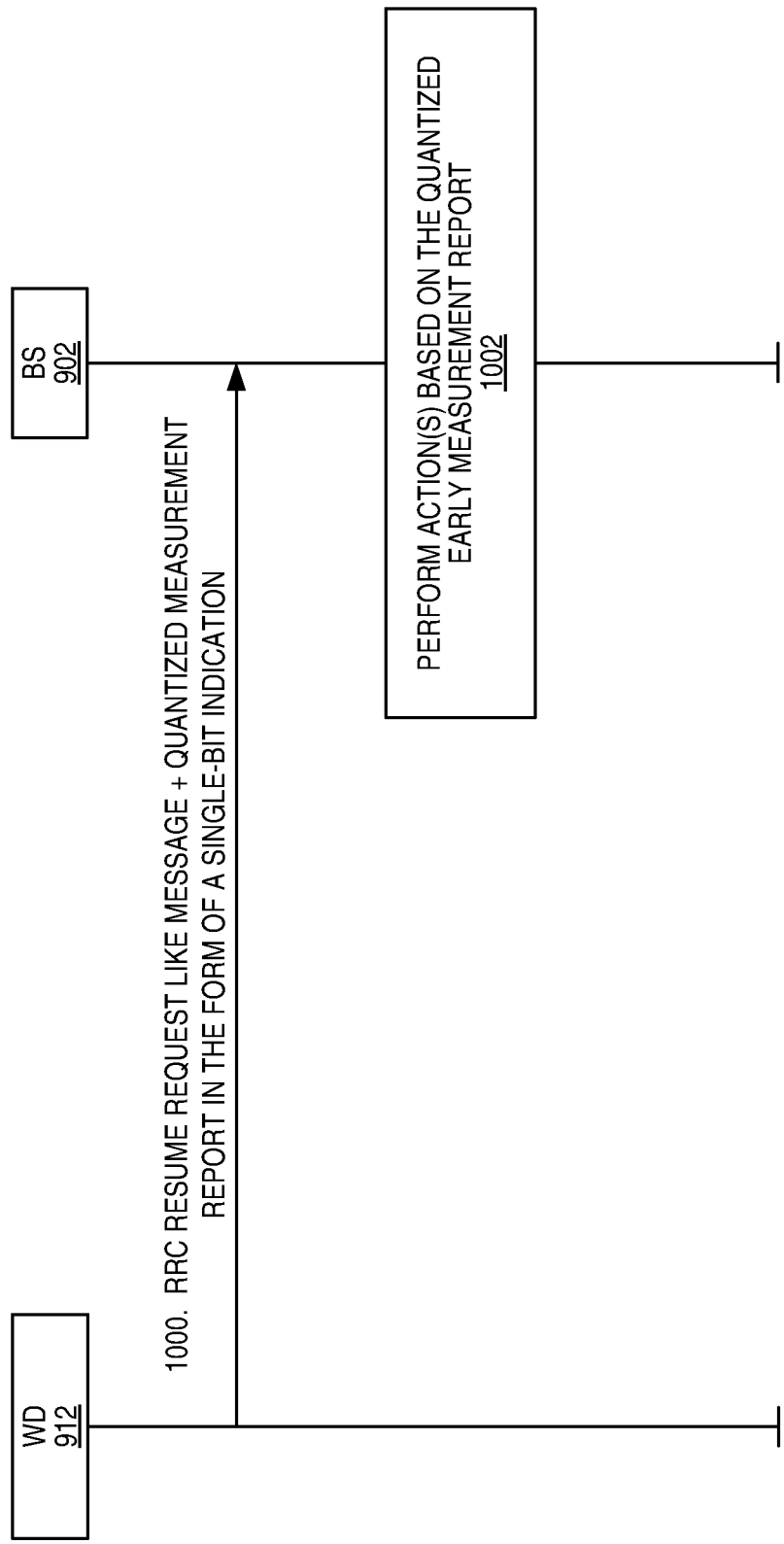
FIG. 10 illustrates the operation of a wireless device (e.g., a UE) and a base station (e.g., NR base station (gNB)) in accordance with embodiments in which quantized early measurement results are reported via a single-bit indication.

FIG. 10 illustrates the operation of a wireless device 912 (e.g., a UE) and a base station 902 (e.g., gNB) in accordance with the single-bit indication embodiments described above. As illustrated in FIG. 10, when the wireless device 912 transitions from a dormant state to a connected state, the wireless device 912 (e.g., a UE) transmits a RRC Resume Request like message to the base station 902 and information that provides a quantized early measurement report which in this case is in the form of the single-bit indication described above (step 1000). In one embodiment, the single-bit indication described above is included in the RRC Resume Request like message. In another embodiment, the single-bit indication is provided together with the RRC Resume Request like message (e.g., multiplex the signal-bit indication together with the RRC message, or using a MAC CE/DCI signaling, or RACH preamble), as described above. The base station 902 can then decide to release the MSG and/or SCG configurations of the wireless device 912, release these configurations, configure the wireless device 912 with the same configurations that it had before it was suspended, or use delta configurations to restore these stored configurations, as described above (step 1002).

2. Multi-Bit Indication in RRC Resume to Partially Restore Previous Configurations In another embodiment, the UE signals the quality of stored serving cells using multiple bits to signal information about multiple cells. In other words, the UE may use a multi-bit indication to signal quality of stored serving cells and information about multiple cells.

For RRC resume, it is possible for the UE to transmit either the RRCResumeRequest or RRCResumeRequest1; the difference being the size of the UE identity. The short Inactive Radio Network Temporary Identifier (I-RNTI) is 24 bits, whereas the full I-RNTI is 40 bits.

- RRCResumeRequest
  The RRCResumeRequest is the 48bit message used to request the resumption of a suspended RRC connection or perform an RNA update.
    Signalling radio bearer: SRB0
    RLC-SAP: TM
    Logical channel: CCCH
    Direction: UE to Network -continued

| RRCResumeRequest message |
|---|

```
-- ASN1START
-- TAG-RRCRESUMEREQUEST-START
RRCResumeRequest ::=            SEQUENCE {
    rrcResumeRequest                RRCResumeRequest-IEs
}
RRCResumeRequest-IEs ::=        SEQUENCE {
    resumeIdentity                  ShortI-RNTI-Value,
    resumeMAC-I                     BIT STRING (SIZE (16)),
    resumeCause                     ResumeCause,
    spare                           BIT STRING (SIZE (1))
}
-- TAG-RRCRESUMEREQUEST-STOP
-- ASN1STOP
```

| RRCResumeRequest field descriptions |
|---| resumeCause
Provides the resume cause for the RRC connection resume request as provided by
the upper layers or RRC. The network is not expected to reject an
RRCResumeRequest due to unknown cause value being used by the UE.
resumeIdentity
UE identity to facilitate UE context retrieval at gNB.
resumeMAC-I
Authentication token to facilitate UE authentication at gNB. The 16 least significant
bits of the MAC-I calculated using the security configuration as specified in 5.3.13.3.

- RRCResumeRequest1
The RRCResumeRequest1 is the 64 bit message used to request the resumption of a
suspended RRC connection or perform an RNA update.
  Signalling radio bearer: SRB0
  RLC-SAP: TM
  Logical channel: CCCH1
  Direction: UE to Network

| RRCResumeRequest1 message |
|---|

```
-- ASN1START
-- TAG-RRCRESUMEREQUEST1-START
RRCResumeRequest1 ::= SEQUENCE {
    rrcResumeRequest1               RRCResumeRequest1-IEs
}
RRCResumeRequest1-IEs ::=       SEQUENCE {
    resumeIdentity                  I-RNTI-Value,
    resumeMAC-I                     BIT STRING (SIZE (16)),
    resumeCause                     ResumeCause,
    spare                           BIT STRING (SIZE (1))
}
-- TAG-RRCRESUMEREQUEST1-STOP
-- ASN1STOP
```

| RRCResumeRequest1-IEs field descriptions |
|---| resumeCause
Provides the resume cause for the RRCResumeRequest1 as provided by the upper
layers or RRC. A gNB is not expected to reject an RRCResumeRequest1 due to
unknown cause value being used by the UE.
resumeIdentity
UE identity to facilitate UE context retrieval at gNB.
resumeMAC-I
Authentication token to facilitate UE authentication at gNB. The 16 least significant
bits of the MAC-I calculated using the security configuration as specified in 5.3.13.3.

Notably, RRCResumeRequest is a 48-bit message and RRCResumeRequest1 is a 64-bit message. In this regard, the RRCResumeRequest1 message is 16 bits larger than the RRCResumeRequest message. These 16 additional bits available in RRCResumeRequest1 may be utilized to signal quantized early measurements, for example, by introducing a new message on the UL-CCCH1 channel.

| - | UL-CCCH1-Message |
|---|---|

The UL-CCCH1-Message class is the set of 64bit RRC messages that may be sent from
the UE to the Network on the uplink CCCH1 logical channel.
```
-- ASN1START
-- TAG-UL-CCCH1-MESSAGE-START
UL-CCCH1-Message ::=            SEQUENCE {
    message                         UL-CCCH1-MessageType
```

```
}
UL-CCCH1-MessageType ::=              CHOICE {
    c1                                CHOICE {
        rrcResumeRequest1                 RRCResumeRequest1,
        rrcResumeRequest1WithCellQual
RRCResumeRequest1WithCellQual,
        spare2 NULL,
        spare1 NULL
    },
    messageClassExtension SEQUENCE { }
}
-- TAG-UL-CCCH1-MESSAGE-STOP
-- ASN1STOP
```

RRCResumeRequestWithCellQual

The RRCResumeRequest1 is the 64 bit message used to request the resumption of a suspended RRC connection or perform an RNA update.
Signalling radio bearer: SRB0
RLC-SAP: TM
Logical channel: CCCH1
Direction: UE to Network RRCResumeRequestWithCellQual message

```
-- ASN1START
-- TAG-RRCRESUMEREQUEST1-START
RRCResumeRequest1WithMeas ::= SEQUENCE {
    rrcResumeRequest1WithMeas           RRCResumeRequest1WithMeas -
IEs
}
RRCResumeRequest1WithMeas-IEs ::=     SEQUENCE {
    resumeIdentity                        ShortI-RNTI-Value,
    resumeMAC-I                           BIT STRING (SIZE (16)),
    resumeCause                           ResumeCause,
    servingCellQualList                   SEQUENCE (SIZE (3)) OF
ServCellIndex,
    spare                                 BIT STRING (SIZE (2))
}
-- TAG-RRCRESUMEREQUEST1-STOP
-- ASN1STOP
```

RRCResumeRequestWithCellQual-IEs field descriptions servingCellQualList
This is a list of the three highest ranking serving cells.

The ranking of the best serving cells can be based on UE implementation, or it can be based on thresholds configured by the network (e.g., in RRCRelease message, system information, etc.), or it could be fixed in the standards (e.g., include the top 3 serving cells that have above threshold value of x). Since the UE is usually camping on the best cell and the request to resume is sent to the camped cell, it may be redundant (e.g., unnecessary) to provide information about that Primary Cell (PCell) in this list. Thus, the network may have up to three additional cells to choose for CA/DC configuration. The ordering of the cells within the list can be used as an indication of the relative quality of the cells (e.g., first entry has the highest quality).

The reason for having only 3 cells is to fit the information within the available 16 bits (since the UE may be configured with up to 32 serving cells, the UE may need 5 bits to identify each serving cell).

Another possibility is to use a bitmap to report only 16 serving cells (e.g., cell indexes 0 to 15), wherein value 0 may indicate a cell being below threshold and value 1 may indicate the respective cell being above threshold. In another variant of this, the spare bit value can be used to indicate the first half or the second half of the serving cell indexes. For example, if the serving cell indexes were divided equally between the MCG and SCG (e.g., 0 to 15 to MCG cells and 16 to 31 to SCG cells), and CA is prioritized over DC, then the spare bit value can be set to indicate CA (e.g., value 0 associated with CA, value 1 associated with DC). If DC is prioritized over CA and network wants the UE to report the SCG cells, then the spare bit can be set to indicate DC (e.g., value 1).

In another embodiment, the multi-bit indication may be treated as an enhancement to the single-bit indication discussed above. In this regard, several single-bit indications are optionally provided. An example of this is shown below, wherein three separate indications may be used to refer to the MCG SCells, SCG SCells, and PSCell signal quality:

RRCResumeRequestWithCellQual message

```
-- ASN1START
-- TAG-RRCRESUMEREQUEST1-START
RRCResumeRequest1WithMeas ::=         SEQUENCE {
    rrcResumeRequest1WithMeas             RRCResumeRequest1WithMeas -
```

```
                RRCResumeRequestWithCellQual message
IEs
}
RRCResumeRequest1WithMeas-IEs ::=    SEQUENCE {
    resumeIdentity                   ShortI-RNTI-Value,
    resumeMAC-I                      BIT STRING (SIZE (16)),
    resumeCause                      ResumeCause,
    storedMCG-SCells                     ENUMERATED {good} OPTIONAL,
    storedSCG-SCells                     ENUMERATED {good} OPTIONAL,
    storedPSCell                 ENUMERATED {good} OPTIONAL,
    spare                            BIT STRING (SIZE (13))
}
-- TAG-RRCRESUMEREQUEST1-STOP
-- ASN1STOP
```

In an alternative embodiment, the results for the stored serving cells are reported using multiple bits, as in the example below:

```
-- ASN1START
-- TAG-RRCRESUMEREQUEST1-START
RRCResumeRequest1WithMeas ::=    SEQUENCE {
    rrcResumeRequest1WithMeas            RRCResumeRequest1WithMeas -
IEs
}
RRCResumeRequest1WithMeas-IEs ::=        SEQUENCE {
    resumeIdentity                   ShortI-RNTI-Value,
    resumeMAC-I                      BIT STRING (SIZE (16)),
    resumeCause                      ResumeCause,
    storedMCG-SCells                     ENUMERATED
{high,medium,low,bad}            OPTIONAL,
    storedSCG-SCells                     ENUMERATED {
high,medium,low,bad }            OPTIONAL,
    storedPSCell                     ENUMERATED { high,medium,low,bad }
OPTIONAL,
    spare                            BIT STRING (SIZE (7))
}
-- TAG-RRCRESUMEREQUEST1-STOP
-- ASN1STOP
```

Figure 11:
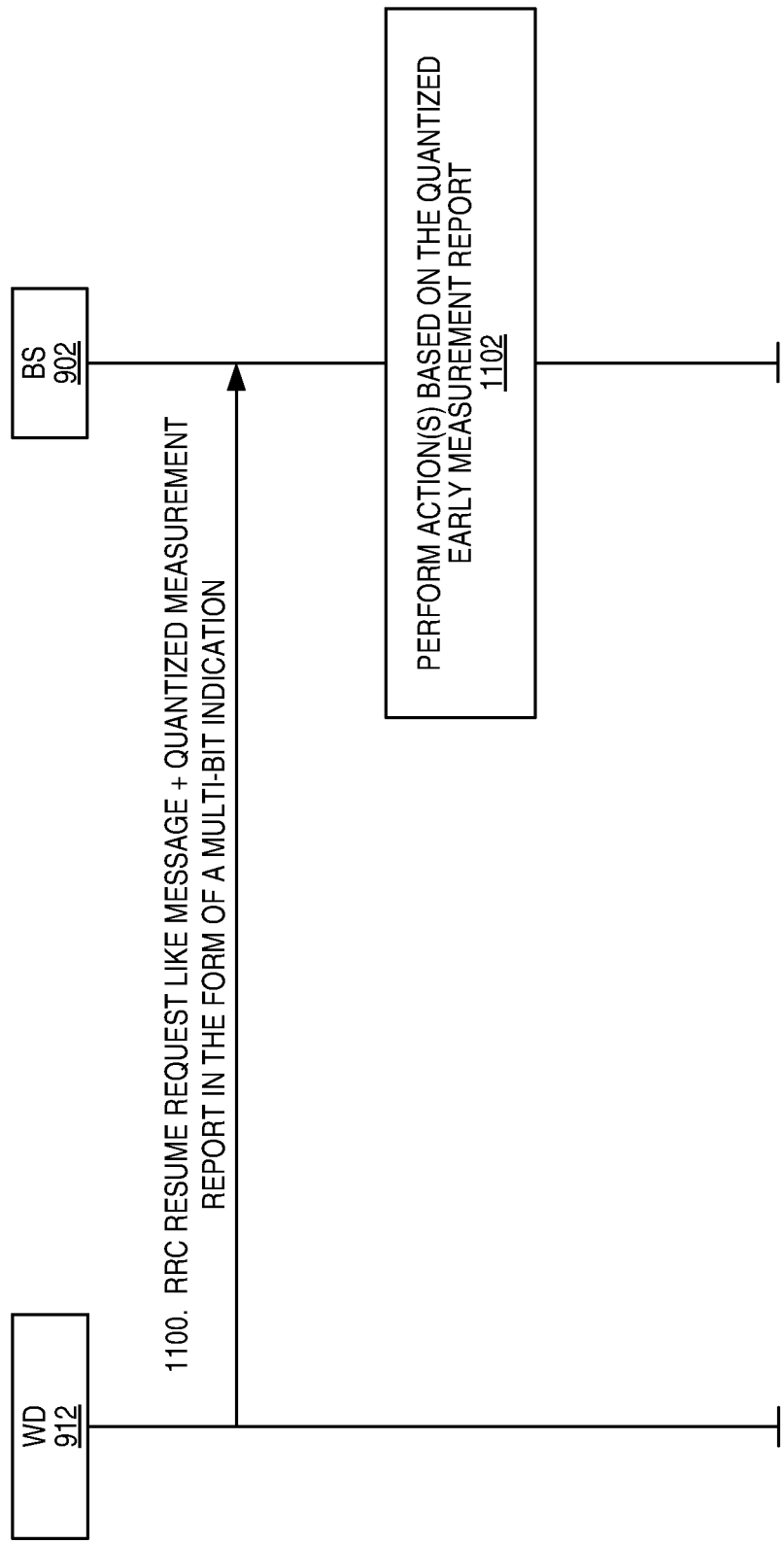
FIG. 11 illustrates the operation of a wireless device (e.g., a UE) and a base station (e.g., gNB) in accordance with embodiments in which quantized early measurement results are reported via a multi-bit indication.

FIG. 11 illustrates the operation of a wireless device 912 (e.g., a UE) and a base station 902 (e.g., gNB) in accordance with the multi-bit indication embodiments described above. As illustrated in FIG. 11, when the wireless device 912 transitions from a dormant state to a connected state, the wireless device 912 (e.g., a UE) transmits a RRC Resume Request like message to the base station 902 and information that provides a quantized early measurement report which in this case is in the form of the multi-bit indication described above (step 1100). In one embodiment, the multi-bit indication described above is included in the RRC Resume Request like message. In another embodiment, the multi-bit indication is provided together with the RRC Resume Request like message (e.g., multiplex the signal-bit indication together with the RRC message, or using a MAC CE/DCI signaling, or RACH preamble, as described above. The base station 902 can then perform one or more actions in response to the received multi-bit indication (step 1102). For example, the base station 902 may release MCG and/or SCG configurations of the wireless device 912, configure the wireless device 912 with the same and/or new configurations as compared to what it had before it was suspended, or use delta configurations, as described above.

Indications Related to Idle/Inactive Measurement Results

In one embodiment, a message similar to the RRCResumeRequestWIthCellQual described above may be used. However, instead of referring to stored serving cells, the indication may be related to cells/frequencies configured to be measured in idle/inactive mode measurement configuration. In the idle/inactive measurement configurations:
  there may be an eight frequency list to measure. Accordingly, there may be up to eight cells within that list;
  there may be two sets of the eight frequency lists, one for LTE and one for NR.
A quantized information like the one shown below is included in the resume request like message.

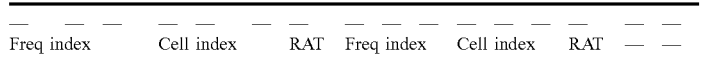

The fields in the quantized information structure may be grouped into two parts, where each part includes a respective frequency index, a respective cell index, and an indication of a respective Radio Access Technology (RAT) to which the cell quality indication refers. The frequency index and cell index may be based on the measIdleConfig that is provided in RRC Release message or system information. In the example below, the frequency index refers to an entry in the EUTRA-CarrierList and the cell index refers to an entry in the measCellList. Thus, an indication of frequency index=3 and cell index=4 refers to the fourth cell entry in the measCellList within the third entry in the EUTRA-CarrierList. If there is a corresponding quantized information structure used for NR measurements, a similar approach may be taken and the respective RAT fields above may distinguish whether the indicated frequency/cell pair is referring to E-UTRA or NR (e.g., RAT=0 refers to E-UTRA, RAT=1 refers to NR, or vice versa). If the network has not provided a cell list for the given frequency, then the network may ignore the cell index value and the network has to decide which cell within that frequency to configure the UE with (e.g., based on other information, network inferred UE location and/or the number of cells at that frequency within the coverage of the cell the UE is resuming in, etc.).

```
EUTRA-CarrierList-r15 ::= SEQUENCE (SIZE (1..maxFreqIdle-r15)) OF
MeasIdleCarrierEUTRA-r15
MeasIdleCarrierEUTRA-r15::=        SEQUENCE {
    carrierFreq-r15                ARFCN-ValueEUTRA-r9,
    allowedMeasBandwidth-r15           AllowedMeasBandwidth,
    validityArea-r15               CellList-r15    OPTIONAL,
    -- Need OR
    measCellList-r15               CellList-r15    OPTIONAL,
    -- Need OR
    reportQuantities               ENUMERATED {rsrp, rsrq, both},
    qualityThreshold-r15           SEQUENCE {
        idleRSRP-Threshold-r15         RSRP-Range
    OPTIONAL,                      -- Need OR
        idleRSRQ-Threshold-r15         RSRQ-Range-r13
    OPTIONAL                       -- Need OR
    }                                  OPTIONAL, --
Need OP
    ...
}
```

In another embodiment, a bitmap structure is used in the RRC Resume Request like message to indicate the quality/suitability of the frequency layers that were configured to be measured via idle/inactive measurement configurations.

Assuming the UE can be configured with up to eight frequency layers to measure in E-UTRA and eight frequency layers in NR, the sixteen spare bits in the modified RRC Resume Request like message discussed above can be sufficient to indicate whether the UE has measured a cell with a required quality on the corresponding frequency. An example of the bitmap structure is shown below.

| freq1 | freq2 | — | ... | — | — | — | — | — | — | — | — | — | — | — | freq16 |
|---|---|---|---|---|---|---|---|---|---|---|---|---|---|---|---|
| E-UTRA frequencies | | | | | | | | NR frequencies | | | | | | | |

In the bitmap structure above, a value of 0 may indicate that the UE has not found a suitable cell at the corresponding frequency. In contrast, a value of 1 may indicate that the UE has found at least one cell. It may be up to the network to decide which cell within the indicated frequency to configure the UE with (e.g., based on other information, network inferred UE location or/and the number of cells at that frequency within the coverage of the cell the UE is resuming in, etc.). If the UE has not been configured with a particular frequency to measure, the UE may signal a 0 and the network will ignore this entry.

Similar to the previous embodiment, the frequency index may be based on the measIdleConfig that is provided in RRCRelease or system information. That is, the frequency index refers to the entry in the EUTRA-CarrierList. For example, a frequency index=3 could refer to the third entry in EUTRA-CarrierList, and a frequency index=11 could refer to the third entry in the NR-CarrierList.

Figure 12:
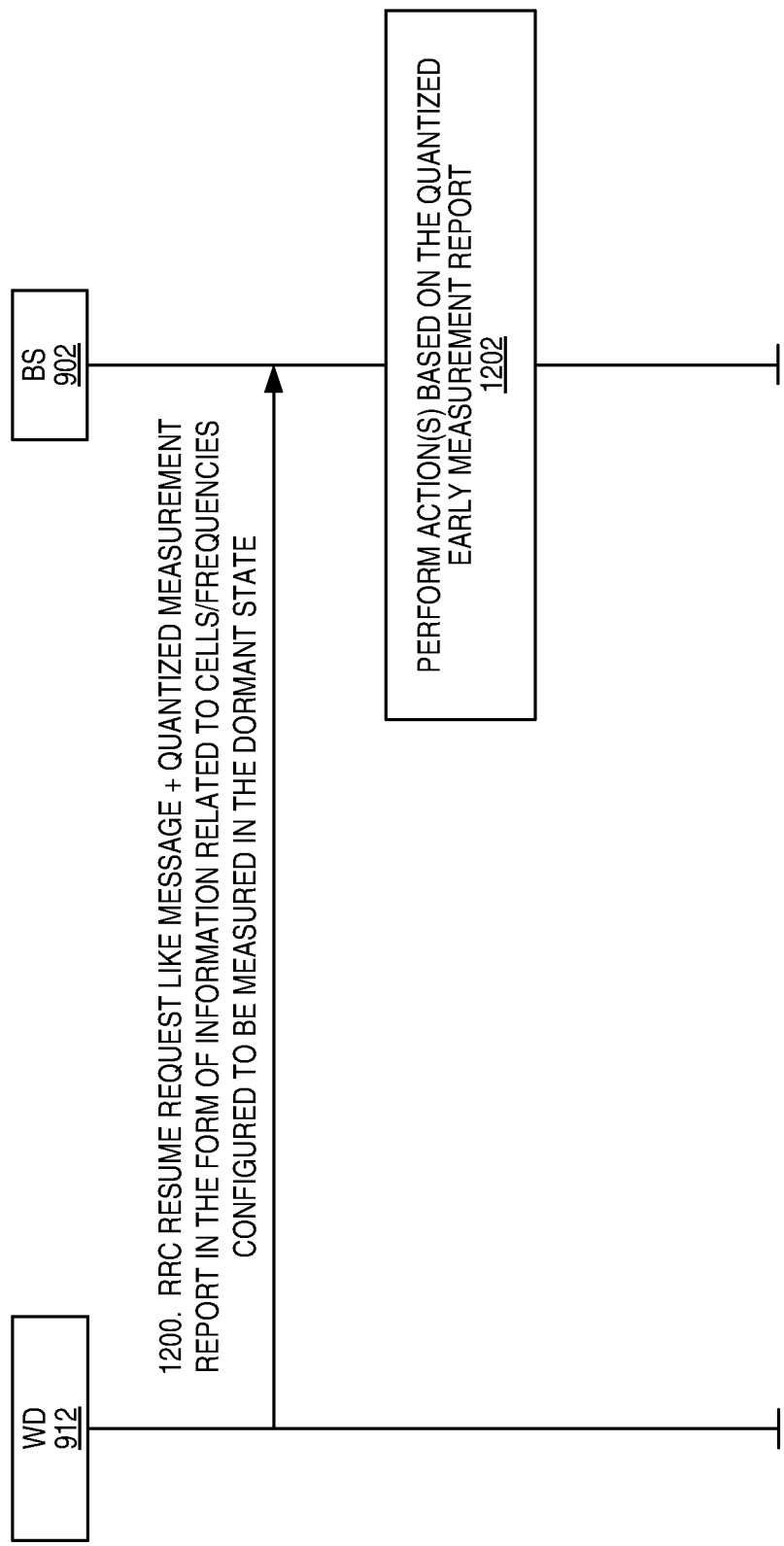
FIG. 12 illustrates the operation of a wireless device (e.g., a UE) and a base station (e.g., gNB) in accordance with embodiments in which quantized early measurement results are reported via an indication related to cells/frequencies configured to be measured in an idle/inactive mode measurement configuration.

FIG. 12 illustrates the operation of a wireless device 912 (e.g., a UE) and a base station 902 (e.g., gNB) in accordance with embodiments of the indication related to cells/frequencies configured to be measured in idle/inactive mode measurement configuration described above. As illustrated in FIG. 12, when the wireless device 912 transitions from a dormant state to a connected state, the wireless device 912 (e.g., a UE) transmits a RRC Resume Request like message to the base station 902 and information that provides a quantized early measurement report which in this case is in the form of the indication related to cells/frequencies configured to be measured in idle/inactive mode measurement configuration described above (step 1200). In one embodiment, the indication described above is included in the RRC Resume Request like message (e.g., in a message similar to the RRCResumeRequestWithCellQual message). In another embodiment, the multi-bit indication is provided together with the RRC Resume Request like message (e.g., multiplex the signal-bit indication together with the RRC message, or using a MAC CE/DCI signaling, or RACH preamble), as described above. The base station 902 can then perform one or more actions in response to the received multi-bit indication (step 1102). For example, the base station 902 may release MSG and/or SCG configurations of the wireless device 912, configure the wireless device 912 with the same and/or new configurations as compared to what it had before it was suspended, or use delta configurations, as described above.

Transmit Quantized Results in Subsequent TBs

If the UE signals that it has early measurement during the random access request by selecting a specific preamble, the network can provide the UE with multiple TBs. In other words, if the UE signals that it has early measurement during the random access request by selecting a specific preamble, the network may allocate multiple TBs to the UE for reporting the quantized early measurements.

Assuming that all TBs are of the same size, the measurements will have to fit within the same message size as an RRCResumeRequest message. In other words, in case all TBs are of the same size, the UE may need to fit the quantized early measurements within a number of TBs that corresponds to the same message size as an RRCResumeRequest message.

It may be possible to extend the UL-CCCH1 channel with a new message for carrying the quantized early measurements. In one embodiment, the new message contains the result of only a single cell (e.g., the best neighboring cell, which may include frequency, physical cell id, and measurement result). In other words, in one embodiment, the new message may be used to report quantized early measurements related to a single cell (e.g., the best neighboring cell, which may include frequency, physical cell ID, and measurement result).

UL-CCCH1-Message

The UL-CCCH1-Message class is the set of 64bit RRC messages that may be sent from the UE to the Network on the uplink CCCH1 logical channel.
```
-- ASN1START
-- TAG-UL-CCCH1-MESSAGE-START
UL-CCCH1-Message ::=           SEQUENCE {
    message                        UL-CCCH1-MessageType
}
UL-CCCH1-MessageType ::=       CHOICE {
    c1                             CHOICE {
        rrcResumeRequest1              RRCResumeRequest1,
        EarlyMeasQuantized             EarlyMeasQuantized,
        spare2 NULL,
        spare1 NULL
    },
    messageClassExtension SEQUENCE { }
}
-- TAG-UL-CCCH1-MESSAGE-STOP
-- ASN1STOP
```

EarlyMeasQuantized1 message

```
-- ASN1START
-- TAG-EARLYMEASUQUANTIZED1-START
EarlyMeasQuantized1 ::= SEQUENCE {
    earlyMeasQuantized1            EarlyMeasQuantized1-IEs
}
EarlyMeasQuantized1-IEs ::=    SEQUENCE {
    ratType                        CHOICE {
        nr                             CellResultNR,
        eutra                          CellResultEUTRA
    }
}
cellResultNR ::= SEQUENCE {
    carrierFreqNR                  ARFCN-ValueNR, - 22 bit
    physCellIdNR                   PhysCellId, - 10 bit
    measResultNR                   SEQUENCE {
        rsrp-Result                    RSRP-RANGE, - 7 bit
        rsrq-Result                    RSRQ-RANGE - 7 bit
    }
} - 48 bit
cellResultEUTRA ::= SEQUENCE {
    carrierFreqEUTRA               ARFCN-ValueEUTRA, - 18 bit
    physCellIdEUTRA                EUTRA-PhysCellId, - 9 bit
    measResultEUTRA                SEQUENCE {
        rsrp-Result                    RSRP-RANGE, - 7 bit
        rsrq-Result                    RSRQ-RANGE - 7 bit
    }
} - 41 bit
-- TAG- EARLYMEASUQUANTIZED1-STOP
-- ASN1STOP
```

In another embodiment, the Early Measurement message includes an indication of whether the UE has further early measurements to include, or the measurement report is the last one. In other words, the UE may include, in the Early Measurement message, an indication to the network that the UE has further (quantized) early measurements to report, or that the measurement report is the last one. This embodiment may help the network to determine whether to provide further grants. This embodiment may be implemented as:

EarlyMeasQuantized1 message

```
-- ASN1START
-- TAG-EARLYMEASUQUANTIZED1-START
EarlyMeasQuantized1 ::= SEQUENCE {
    earlyMeasQuantized1            EarlyMeasQuantized1-IEs
}
EarlyMeasQuantized1-IEs ::=    SEQUENCE {
    ratType                        CHOICE {
        nr                             CellResultNR,
        eutra                          CellResultEUTRA
```

-continued

EarlyMeasQuantized1 message

```
    }, - 41/49 bit
    lastMeasurement                ENUMERATED {true} - 1 bit
}- 42/50 bit
cellResultNR ::= SEQUENCE {
    carrierFreqNR                  ARFCN-ValueNR, - 22 bit
    physCellIdNR                   PhysCellId, - 10 bit
    measResultNR                   SEQUENCE {
        rsrp-Result                    RSRP-RANGE, - 7 bit
        rsrq-Result                    RSRQ-RANGE - 7 bit
    }
} - 48 bit
cellResultEUTRA ::= SEQUENCE {
    carrierFreqEUTRA               ARFCN-ValueEUTRA, - 18 bit
    physCellIdEUTRA                EUTRA-PhysCellId, - 9 bit
    measResultEUTRA                SEQUENCE {
        rsrp-Result                    RSRP-RANGE, - 7 bit
        rsrq-Result                    RSRQ-RANGE - 7 bit
    }
} - 41 bit
```

| EarlyMeasQuantized1 message |
| --- |
| -- TAG- EARLYMEASUQUANTIZED1-STOP<br>-- ASN1STOP |

In another embodiment, the Early Measurement message may include an indication of how many measurements the UE has left to report. In other words, the UE includes, in the Early Measurement message, an indication to the network of how may (quantized) measurements the UE has left to report. This embodiment may also help the network to determine whether to provide further grants. This embodiment may be implemented as:

| EarlyMeasQuantized1 message |
| --- |
| ```
-- ASN1START
-- TAG-EARLYMEASUQUANTIZED1-START
EarlyMeasQuantized1 ::= SEQUENCE {
    earlyMeasQuantized1          EarlyMeasQuantized1-
IEs
}
EarlyMeasQuantized1-IEs ::=      SEQUENCE {
    ratType                          CHOICE {
        nr                               CellResultNR
        eutra                            CellResultEUTRA
    },- 41/49 bit
    measurementsLeft             INTEGER {8} - 3 bit
} - 44/52 bit
cellResultNR ::= SEQUENCE {
    carrierFreqNR                ARFCN-ValueNR, - 22 bit
    physCellIdNR                 PhysCellId, - 10 bit
    measResultNR                 SEQUENCE {
        rsrp-Result                  RSRP-RANGE, - 7 bit
        rsrq-Result                  RSRQ-RANGE - 7 bit
    }
} - 48 bit
cellResultEUTRA ::= SEQUENCE {
    carrierFreqEUTRA             ARFCN-ValueEUTRA, - 18 bit
    physCellIdEUTRA              EUTRA-PhysCellId, - 9 bit
    measResultEUTRA              SEQUENCE {
        rsrp-Result                  RSRP-RANGE, - 7 bit
        rsrq-Result                  RSRQ-RANGE - 7 bit
    }
} - 41 bit
-- TAG- EARLYMEASUQUANTIZED1-STOP
-- ASN1STOP
``` |

In another embodiment, the UE includes only a truncated measurement result, for example, only indicating if a particular LTE or NR cell is good or bad, in order to report one E-UTRA and one NR cell at once. This could be implemented as follows:

```
-- ASN1START
-- TAG-EARLYMEASUQUANTIZED1-START
EarlyMeasQuantized1 ::= SEQUENCE {
    earlyMeasQuantized1          EarlyMeasQuantized1-
IEs
}
EarlyMeasQuantized1-IEs ::=      SEQUENCE {
    cellResultNR                 cellResultNR, - 33 bit
    cellResultEUTRA              cellResultEUTRA - 28 bit
} - 61 bit
cellResultNR ::= SEQUENCE {
    carrierFreqNR                ARFCN-ValueNR, - 22 bit
    physCellIdNR                 PhysCellId, - 10 bit
    cellQuality                  ENUMERATED,{good,bad} - 1 bit
} - 33 bit
cellResultEUTRA ::= SEQUENCE {
    carrierFreqEUTRA             ARFCN-ValueEUTRA, - 18 bit
    physCellIdEUTRA              EUTRA-PhysCellId, - 9 bit
    cellQuality                  ENUMERATED,{good,bad} - 1 bit
} - 28 bit
-- TAG-EARLYMEASUQUANTIZED1-STOP
-- ASN1STOP
```

In the above embodiment, the UE would only report the best E-UTRA cell, the best NR cell, and whether these cells fulfill a condition.

Figure 13:
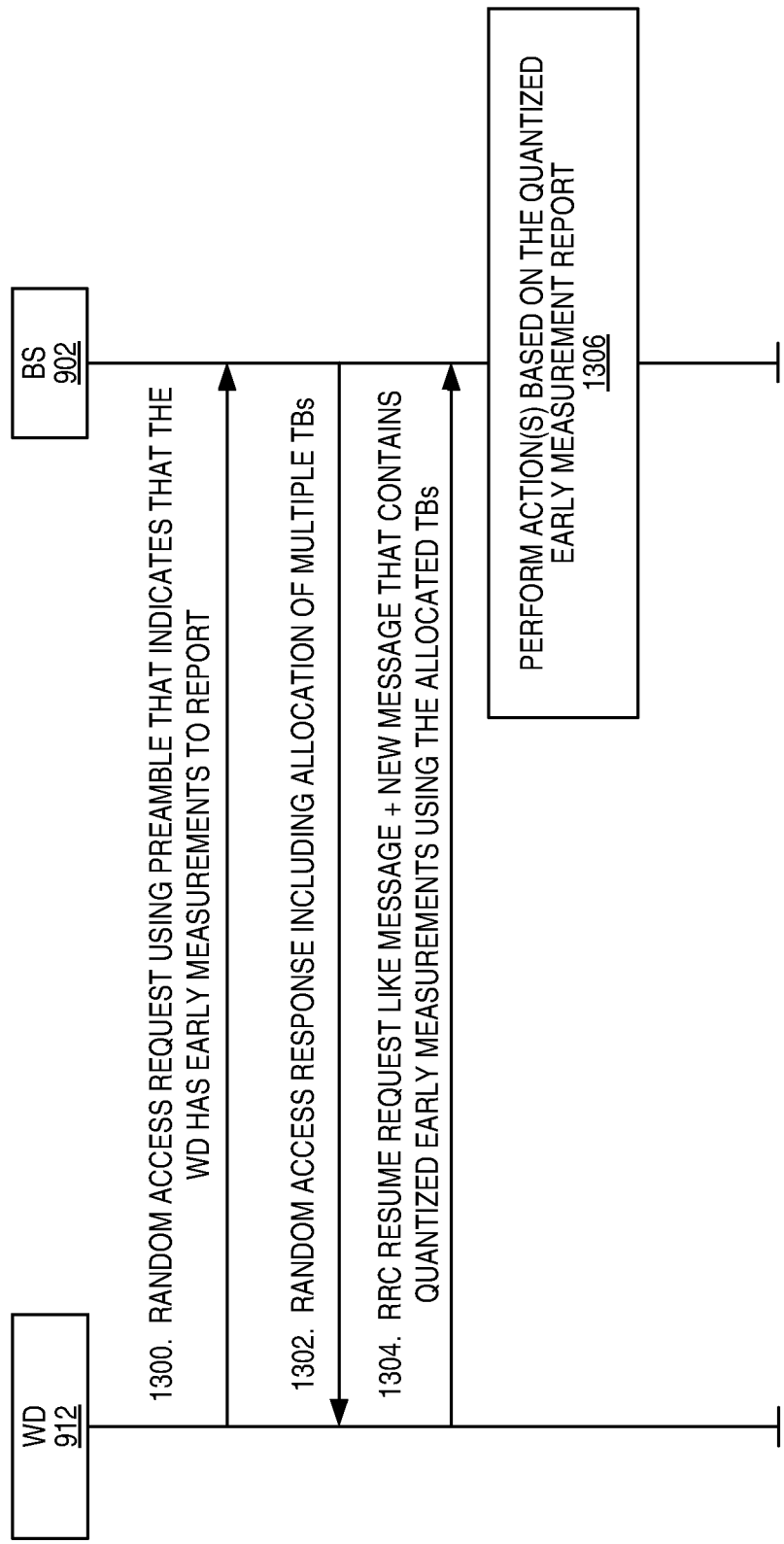
FIG. 13 illustrates the operation of a wireless device (e.g., a UE) and a base station (e.g., gNB) in accordance with embodiments in which quantized early measurement results are reported in subsequent transport blocks (i.e., subsequent to the transport block in which the RRC Resume Request like message is transmitted)

FIG. 13 illustrates the operation of a wireless device 912 (e.g., a UE) and a base station 902 (e.g., gNB) in accordance with the embodiments described above in which quantized early measurement results are reported in subsequent TBs (i.e., subsequent to the TB in which the RRC Resume Request like message is transmitted). As illustrated in FIG. 13, when the wireless device 912 transitions from a dormant state to a connected state, the wireless device 912 (e.g., a UE) transmits a random access request using a specific preamble to thereby indicate that the wireless device 912 has early measurements to report (step 1300). In response, the base station 902 sends a random access response including an allocation of multiple TBs, which may each have the same size as the RRC Resume Request like message (step 1302). The wireless device 912 then transmits an RRC Resume Request like message and a new message that contains quantized early measurement(s) (e.g., new UL-CCCH1-Message EarlyMeasQuantized) using the allocated TBs (step 1304). As discussed above, in one embodiment, the new message contains quantized the early measurement result for a single cell (e.g., the best neighboring cell). In another embodiment, the new message includes an indication of whether the wireless device 912 has further early measurements to report, or if this is the last one. In another embodiment, the new message includes an indication of how many early measurements that the wireless device 912 has left to report. In another embodiment, the new message includes only a truncated measurement result. The base station 902 can then perform one or more actions in response to the received RRC Resume Request like message and the received new message, as will be appreciated by one of skill in the art (step 1306).

Additional Aspects

Figure 14:
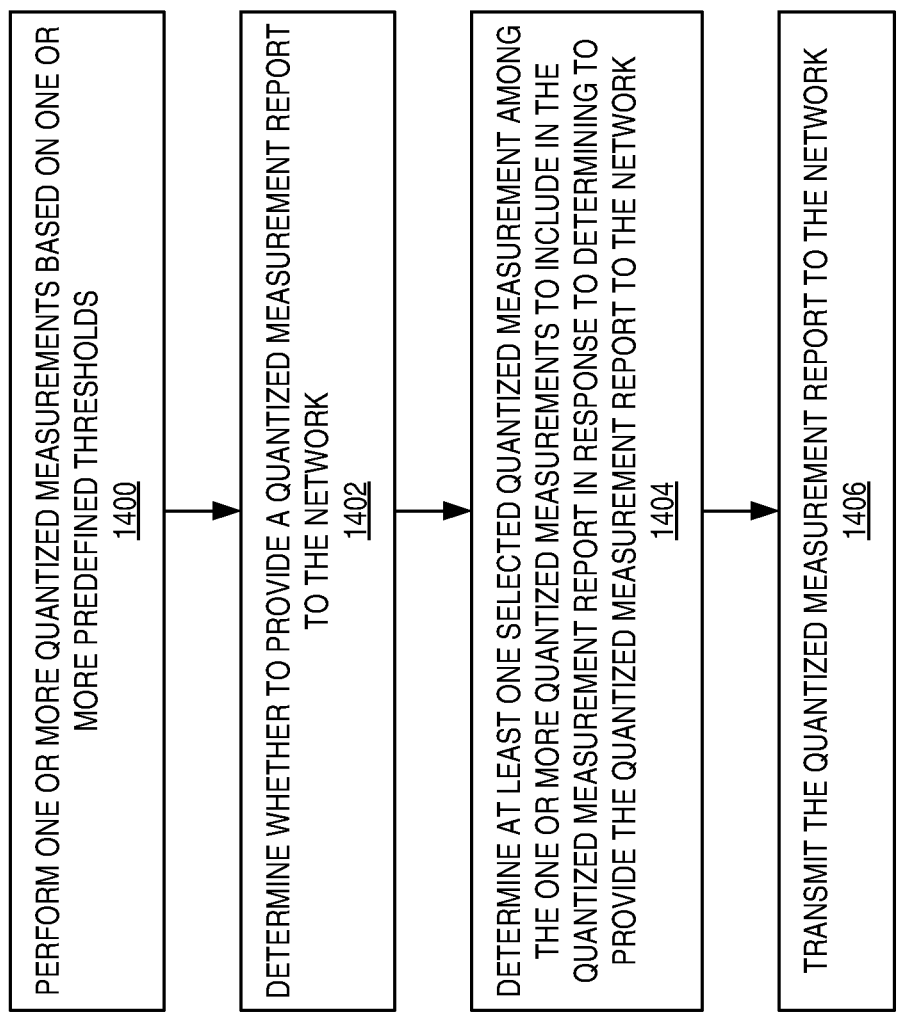
FIG. 14 is a flow diagram illustrating an exemplary method performed by a wireless device (e.g., a UE) for reporting quantized early measurements to a network node.

FIG. 14 is a flow chart that illustrates the operation of a wireless device (e.g., a UE) configured according to some embodiments of the present disclosure to report quantized early measurements to a network. The wireless device may be configured to perform one or more quantized measurements based on one or more predefined thresholds (step 1400). Subsequently, the wireless device may be configured to determine whether to provide a quantized measurement report to the network (step 1402). In response to determining to provide the quantized measurement report to the network, the wireless device may be further configured to determine at least one selected quantized measurement among the one or more quantized measurements to include in the quantized measurement report (step 1404). Accordingly, the wireless device may be configured to transmit the quantized measurement report to the network in a selected RRC request message (e.g., an RRC Resume Request, an RRC Setup Request, an RRC Connection Setup, etc.) (step 1406).

Figure 15:
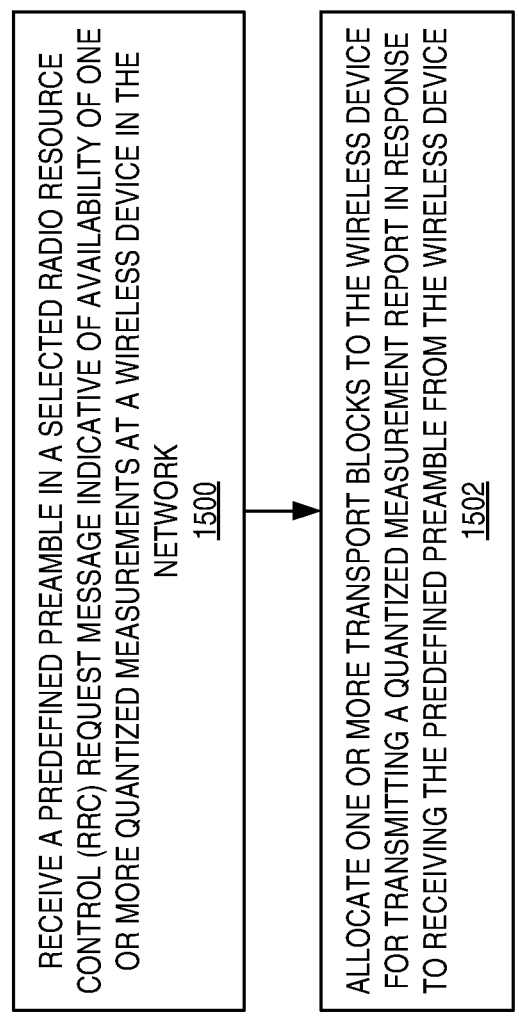
FIG. 15 is a flow diagram illustrating an exemplary method performed by a base station for enabling quantized early measurements in a network.

FIG. 15 is a flow chart that illustrates the operation of a base station (e.g., an eNB) in a network configured according to some embodiments of the present disclosure to enable quantized early measurements in the network. The base station may receive a predefined preamble in a selected RRC request message (e.g., an RRC Resume Request, an RRC Setup Request, an RRC Connection Setup, etc.) indicative of availability of one or more quantized measurements at a wireless device in the network (step 1500). In response to receiving the predefined preamble from the wireless device, the base station may be configured to allocate one or more TBs to the wireless device for transmitting a quantized measurement report (step 1502).

Figure 16:
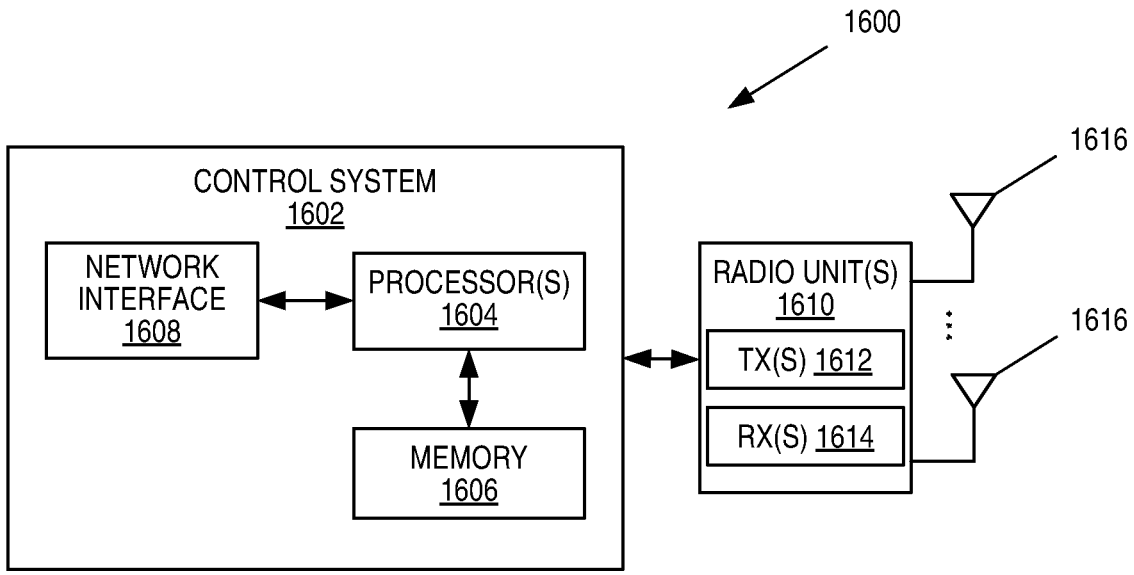
FIG. 16 is a schematic block diagram of a radio access node according to some embodiments of the present disclosure.

FIG. 16 is a schematic block diagram of a radio access node 1600 according to some embodiments of the present disclosure. The radio access node 1600 may be, for example, a base station 902 or 906. As illustrated, the radio access node 1600 includes a control system 1602 that includes one or more processors 1604 (e.g., Central Processing Units (CPUs), Application Specific Integrated Circuits (ASICs), Field Programmable Gate Arrays (FPGAs), and/or the like), memory 1606, and a network interface 1608. The one or more processors 1604 are also referred to herein as processing circuitry. In addition, the radio access node 1600 includes one or more radio units 1610 that each includes one or more transmitters 1612 and one or more receivers 1614 coupled to one or more antennas 1616. The radio units 1610 may be referred to or be part of radio interface circuitry. In some embodiments, the radio unit(s) 1610 is external to the control system 1602 and connected to the control system 1602 via, e.g., a wired connection (e.g., an optical cable). However, in some other embodiments, the radio unit(s) 1610 and potentially the antenna(s) 1616 are integrated together with the control system 1602. The one or more processors 1604 operate to provide one or more functions of a radio access node 1600 as described herein. In some embodiments, the function(s) are implemented in software that is stored, e.g., in the memory 1606 and executed by the one or more processors 1604.

Figure 17:
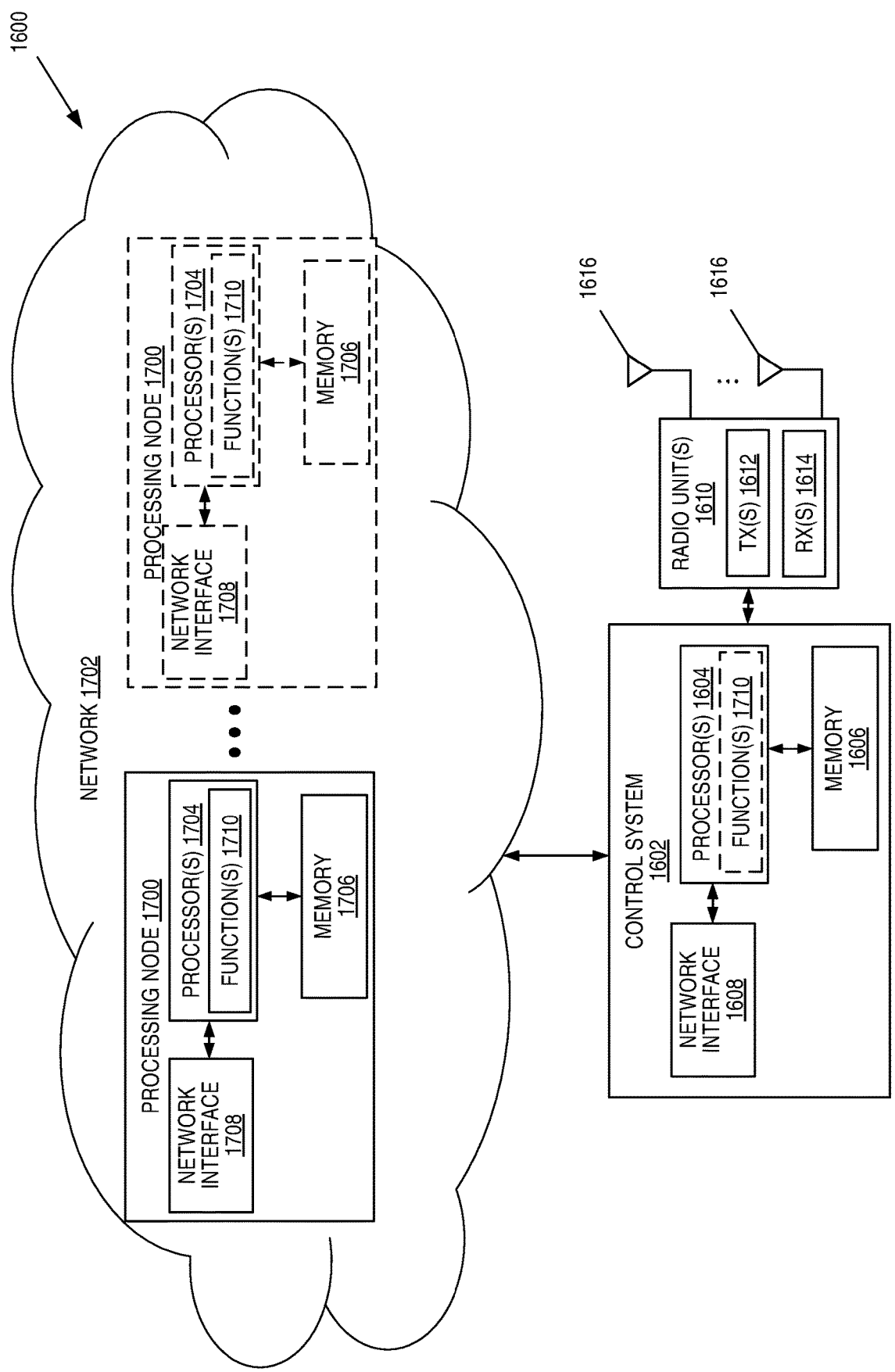
FIG. 17 is a schematic block diagram that illustrates a virtualized embodiment of the radio access node of FIG. 16 according to some embodiments of the present disclosure.

FIG. 17 is a schematic block diagram that illustrates a virtualized embodiment of the radio access node 1600 according to some embodiments of the present disclosure. This discussion is equally applicable to other types of network nodes. Further, other types of network nodes may have similar virtualized architectures.

As used herein, a "virtualized" radio access node is an implementation of the radio access node 1600 in which at least a portion of the functionality of the radio access node 1600 is implemented as a virtual component(s) (e.g., via a virtual machine(s) executing on a physical processing node(s) in a network(s)). As illustrated, in this example, the radio access node 1600 includes the control system 1602 that includes the one or more processors 1604 (e.g., CPUs, ASICs, FPGAs, and/or the like), the memory 1606, and the network interface 1608 and the one or more radio units 1610 that each includes the one or more transmitters 1612 and the one or more receivers 1614 coupled to the one or more antennas 1616, as described above. The control system 1602 is connected to the radio unit(s) 1610 via, for example, an optical cable or the like. The control system 1602 is connected to one or more processing nodes 1700 coupled to or included as part of a network(s) 1702 via the network interface 1608. Each processing node 1700 includes one or more processors 1704 (e.g., CPUs, ASICs, FPGAs, and/or the like), memory 1706, and a network interface 1708.

In this example, functions 1710 of the radio access node 1600 described herein are implemented at the one or more processing nodes 1700 or distributed across the control system 1602 and the one or more processing nodes 1700 in any desired manner. In some particular embodiments, some or all of the functions 1710 of the radio access node 1600 described herein are implemented as virtual components executed by one or more virtual machines implemented in a virtual environment(s) hosted by the processing node(s) 1700. As will be appreciated by one of ordinary skill in the art, additional signaling or communication between the processing node(s) 1700 and the control system 1602 is used in order to carry out at least some of the desired functions 1710. Notably, in some embodiments, the control system 1602 may not be included, in which case the radio unit(s) 1610 communicate directly with the processing node(s) 1700 via an appropriate network interface(s).

In some embodiments, a computer program including instructions which, when executed by at least one processor, causes the at least one processor to carry out the functionality of radio access node 1600 or a node (e.g., a processing node 1700) implementing one or more of the functions 1710 of the radio access node 1600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
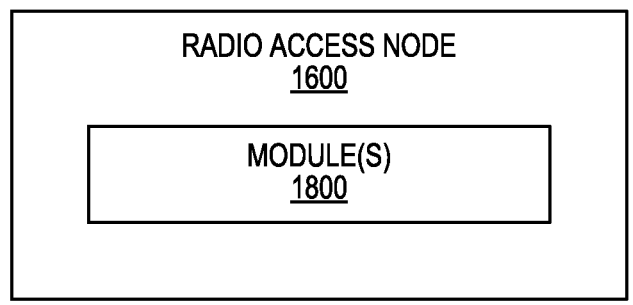
FIG. 18 is a schematic block diagram of the radio access node of FIG. 16 according to some other embodiments of the present disclosure.

FIG. 18 is a schematic block diagram of the radio access node 1600 according to some other embodiments of the present disclosure. The radio access node 1600 includes one or more modules 1800, each of which is implemented in software. The module(s) 1800 provide the functionality of the radio access node 1600 described herein. This discussion is equally applicable to the processing node 1700 of FIG. 17 where the modules 1800 may be implemented at one of the processing nodes 1700 or distributed across multiple processing nodes 1700 and/or distributed across the processing node(s) 1700 and the control system 1602.

Figure 19:
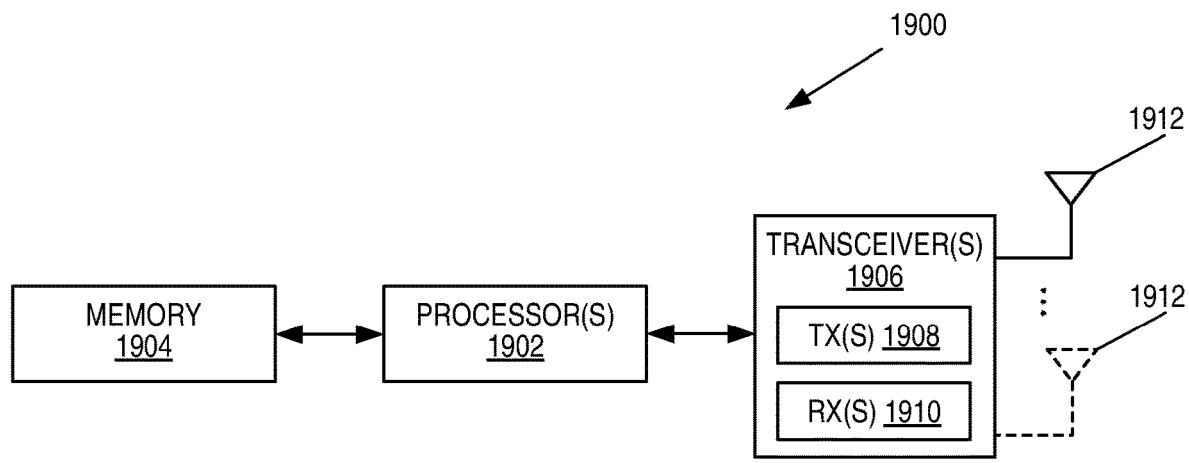
FIG. 19 is a schematic block diagram of a UE according to some embodiments of the present disclosure.

FIG. 19 is a schematic block diagram of a UE 1900 according to some embodiments of the present disclosure. As illustrated, the UE 1900 includes one or more processors 1902 (e.g., CPUs, ASICs, FPGAs, and/or the like), memory 1904, and one or more transceivers 1906 each including one or more transmitters 1908 and one or more receivers 1910 coupled to one or more antennas 1912. The transceiver(s) 1906 includes radio-front end circuitry connected to the antenna(s) 1912 that is configured to condition signals communicated between the antenna(s) 1912 and the processor(s) 1902, as will be appreciated by on of ordinary skill in the art. The processors 1902 are also referred to herein as processing circuitry. The transceivers 1906 are also referred to herein as radio circuitry. In some embodiments, the functionality of the UE 1900 described above may be fully or partially implemented in software that is, e.g., stored in the memory 1904 and executed by the processor(s) 1902. Note that the UE 1900 may include additional components not illustrated in FIG. 19 such as, e.g., one or more user interface components (e.g., an input/output interface including a display, buttons, a touch screen, a microphone, a speaker(s), and/or the like and/or any other components for allowing input of information into the UE 1900 and/or allowing output of information from the UE 1900), a power supply (e.g., a battery and associated power circuitry), etc.

In some embodiments, a computer program including instructions which, when executed by at least one processor, causes the at least one processor to carry out the functionality of the UE 1900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
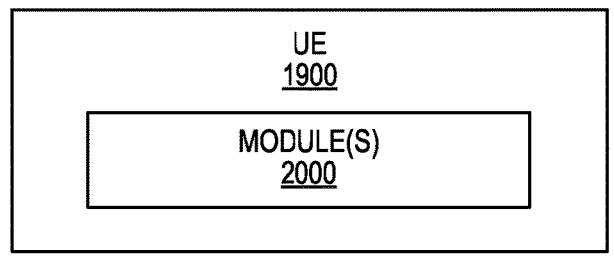
FIG. 20 is a schematic block diagram of the UE of FIG. 19 according to some other embodiments of the present disclosure.

FIG. 20 is a schematic block diagram of the UE 1900 according to some other embodiments of the present disclosure. The UE 1900 includes one or more modules 2000, each of which is implemented in software. The module(s) 2000 provide the functionality of the UE 1900 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device for reporting quantized early measurements to a network, the method comprising:
- performing (900) one or more quantized measurements based on one or more predefined thresholds;
- determining (902) whether to provide a quantized measurement report to the network;
- determining (904) at least one selected quantized measurement among the one or more quantized measurements to include in the quantized measurement report in response to determining to provide the quantized measurement to the network; and
- transmitting (906) the quantized measurement report to the network.

Embodiment 2: The method of any of the previous embodiments, further comprising the step of transmitting the quantized measurement report to the network in an RRC request message selected from the group consisting of: an RRC Resume Request, an RRC Setup Request, and an RRC Connection Setup Request.

Embodiment 3: The method of any of the previous embodiments, further comprising the step of performing the one or more quantized measurements while the wireless device is in a dormant stated.

Embodiment 4: The method of any of the previous embodiments, further comprising the step of transmitting the quantized measurement report to the network in a selected radio resource control (RRC) request message.

Embodiment 5: The method of any of the previous embodiments, further comprising the step of using a predefined preamble in the selected RRC request message to indicate availability of the one or more quantized measurements.

Embodiment 6: The method of any of the previous embodiments, further comprising the step of providing a single bit indication indicative of previous master serving cell (MCG) and secondary serving cell (SCG).

Embodiment 7: The method of any of the previous embodiments, further comprising the step of providing a multi-bit indication indicative of multiple stored serving cells.

Embodiment 8: The method of any of the previous embodiments, further comprising the step of providing a multi-bit indication indicative of cells and frequencies being measured.

Embodiment 9: The method of any of the previous embodiments, further comprising the step of truncating the at least one selected quantized measurement to fit into a transport block.

Embodiment 10: The method of any of the previous embodiments, further comprising the step of transmitting the quantized measurement report prior to security activation.

Embodiment 11: The method of any of the previous embodiments, further comprising the step of storing the one or more quantized measurements.

Embodiment 12: The method of any of the previous embodiments, further comprising: providing user data; and forwarding the user data to a host computer via the transmission to the base station.

Group B Embodiments

Embodiment 13: A method performed by a base station for enabling quantized early measurements in a network, the method comprising:
- receiving (1000) a predefined preamble in a selected radio resource control (RRC) request message indicative of availability of one or more quantized measurements at a wireless device in the network; and
- allocating (1002) one or more transport blocks to the wireless device for transmitting a quantized measurement report in response to receiving the predefined preamble from the wireless device.

Embodiment 14: The method of any of the previous embodiments, further comprising the step of allocating the one or more transport blocks to the wireless device prior to security activation.

Embodiment 15: The method of any of the previous embodiments, further comprising the step of receiving the predefined preamble in an RRC request message selected from the group consisting of: an RRC Resume Request, an RRC Setup Request, and an RRC Connection Setup Request.

Embodiment 16: The method of any of the previous embodiments, further comprising: obtaining user data; and forwarding the user data to a host computer or a wireless device.

Group C Embodiments

Embodiment 17: A wireless device for reporting quantized early measurements to a network, the wireless device comprising: processing circuitry configured to perform any of the steps of any of the Group A embodiments; and power supply circuitry configured to supply power to the wireless device.

Embodiment 18: A base station for enabling quantized early measurements in a network, the base station comprising: processing circuitry configured to perform any of the steps of any of the Group B embodiments; and power supply circuitry configured to supply power to the base station.

Embodiment 19: A User Equipment, UE, for reporting quantized early measurements to a network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
AP Access Point
AS Access Stratum
ASIC Application Specific Integrated Circuit
CA Carrier Aggregation
CE Control Element
CN Core Network
CPU Central Processing Unit
CSI-RS Channel State Information Reference Signal
DC Dual Connectivity
DCI Downlink Control Information
DSP Digital Signal Processor
eNB Enhanced or Evolved Node B
EN-DC Evolved Universal Terrestrial Radio Access New Radio Dual Connectivity
eLTE Enhanced Long Term Evolution
EPC Evolved Packet Core
euCA Enhancing Utilization of Carrier Aggregation
E-UTRA Evolved Universal Terrestrial Radio Access
FPGA Field Programmable Gate Array
gNB New Radio Base Station
ID Identifier
I-RNTI Inactive Radio Network Temporary Identifier
LTE Long Term Evolution
MAC Medium Access Control
MCG Master Cell Group
MeNB Master Enhanced or Evolved Node B
MME Mobility Management Entity
MR-DC Multi-Radio Dual Connectivity
ms Millisecond
MTC Machine Type Communication
ng-eNB Next Generation Enhanced or Evolved Node B
NGEN-DC Next Generation Dual Connectivity
NG-RAN Next Generation Radio Access Network
NR New Radio
OTT Over-the-Top
PCell Primary Cell
PCI Physical Cell Identification
P-GW Packet Data Network Gateway
PSCell Primary Secondary Cell
PUSCH Physical Uplink Shared Channel
RACH Random Access Channel
RAM Random Access Memory
RAN Radio Access Network
RAT Radio Access Technology
ROM Read Only Memory
RRC Radio Resource Control
RRH Remote Radio Head
RRM Radio Resource Management
RSRP Reference Signal Received Power
RSRQ Reference Signal Received Quality
RTT Round Trip Time
SA Stand-Alone
SCG Secondary Cell Group
SCEF Service Capability Exposure Function
SCG Secondary Cell Group
SCell Secondary Cell
SIB System Information Block
SINR Signal-to-Interference-plus-Noise Ratio
SSB Synchronization Signal Block
TB Transport Block
TS Technical Specification
UE User Equipment
UL-CCCH Uplink Common Control Channel Those skilled in the art will recognize improvements and modifications to the embodiments of the present disclosure. All such improvements and modifications are considered within the scope of the concepts disclosed herein.

What is claimed is:

1. A method performed by a wireless device for reporting quantized early measurements to a network node, the method comprising:
    when the wireless device is transitioning from a dormant state to a connected state, transmitting, to a network node:
        a Radio Resource Control (RRC) resume request like message or an RRC setup request like message;
        a report of one or more quantized early measurements; and
        wherein the report of the one or more quantized early measurements comprises one or more indications related to quantized early measurement results for one or more cells and/or frequencies for which the wireless device was configured to perform early measurements; and
        wherein the indication is comprised in the RRC resume request like message or the RRC setup request like message; and
        wherein the one or more indications is used by the network node to configure cells for the wireless device.

2. The method of claim 1 wherein the report of the one or more quantized early measurements comprises a single-bit indication.

3. The method of claim 2 wherein the single-bit indication indicates that:
    early measurements performed by the wireless device while in the dormant state for all previous master cell group secondary cells with which the wireless device was configured prior to entering the dormant state are above a threshold;
    early measurements performed by the wireless device while in the dormant state for all previous master cell group secondary cells with which the wireless device was configured prior to entering the dormant state are above or below a threshold;
an early measurement(s) performed by the wireless device while in the dormant state for a previous primary secondary cell of the wireless device for dual connectivity prior to entering the dormant state is(are) above a threshold;
an early measurement(s) performed by the wireless device while in the dormant state for a previous primary secondary cell of the wireless device for dual connectivity prior to entering the dormant state is(are) above or below a threshold;
early measurements performed by the wireless device while in the dormant state for all previous serving cells of the wireless device in a secondary cell group with which the wireless device was configured prior to entering the dormant state are above a threshold;
early measurements performed by the wireless device while in the dormant state for all previous serving cells of the wireless device in a secondary cell group with which the wireless device was configured prior to entering the dormant state are above or below a threshold;
early measurements performed by the wireless device while in the dormant state for all previous master cell group secondary cells with which the wireless device was configured prior to entering the dormant state and all previous serving cells of the wireless device in a secondary cell group with which the wireless device was configured prior to entering the dormant state are above or below a threshold; or
early measurements performed by the wireless device while in the dormant state for all previous master cell group secondary cells with which the wireless device was configured prior to entering the dormant state and all previous serving cells of the wireless device in a secondary cell group with which the wireless device was configured prior to entering the dormant state are above or below a threshold.

4. The method of claim 2 wherein the single-bit indication is comprised in the RRC resume request like message or the RRC setup request like message using a previously identified spare bit.

5. The method of claim 1 wherein the report of the one or more quantized early measurements comprises a multi-bit indication that indicates information about multiple cells.

6. The method of claim 5 wherein the RRC resume request like message or the RRC setup request like message is a RRCResumeRequest1 message in which a number of bits of a resume identity comprised in the RRCResumeRequest1 message are utilized to provide the multi-bit indication.

7. The method of claim 5 wherein the multi-bit indication is a ranked list of N best serving cells of the wireless device, where N is an integer.

8. The method of claim 5 wherein the multi-bit indication is a ranked list of N best serving cells of the wireless device, other than a cell on which the RRC resume request like message or the RRC setup request like message is transmitted, where N is an integer.

9. The method of claim 5 wherein the multi-bit indication is a bitmap to report N serving cells, where a value of '0' in the bitmap indicates that an early measurement(s) on a respective cell is below a threshold and a value of '1' in the bitmap indicates that the early measurement(s) on the respective cell is above the threshold, where N is an integer.

10. The method of claim 5 wherein the multi-bit indication comprises two or more single-bit indications.

11. The method of claim 10 wherein:
each of the two or more single-bit indications is an indication of one of the following:
  a. early measurements performed by the wireless device while in the dormant state for all previous master cell group secondary cells with which the wireless device was configured prior to entering the dormant state are above or below a threshold;
  b. an early measurement(s) performed by the wireless device while in the dormant state for a previous primary secondary cell of the wireless device for dual connectivity prior to entering the dormant state is(are) above or below a threshold;
  c. early measurements performed by the wireless device while in the dormant state for all previous serving cells of the wireless device in a secondary cell group with which the wireless device was configured prior to entering the dormant state are above or below a threshold; or
  d. early measurements performed by the wireless device while in the dormant state for all previous master cell group secondary cells with which the wireless device was configured prior to entering the dormant state and all previous serving cells of the wireless device in a secondary cell group with which the wireless device was configured prior to entering the dormant state are above or below a threshold; and
a first single-bit indication from among the two or more single-bit indications is an indication of one of a-d, and a second single-bit indication from among the two or more single-bit indications is an indication of a different one of a-d.

12. The method of claim 1 wherein each of the one or more indications comprises a frequency index, a cell index, and a radio access technology indicator.

13. The method of claim 1 wherein the one or more indications provide a list of cells for which early measurements performed by the wireless device while in the dormant state are above a threshold.

14. The method of claim 1 wherein the report of the one or more quantized early measurements comprises one or more indications related to quantized early measurement results for one or more frequency layers for which the wireless device was configured to perform early measurements.

15. The method of claim 1 wherein the report of the one or more quantized early measurements is transmitted in one or more transport blocks subsequent to a transport block in which the RRC resume request like message or the RRC setup request like message is transmitted.

16. The method of claim 1 wherein the report of the one or more quantized early measurements is transmitted in a message in one or more transport blocks subsequent to a transport block in which the RRC resume request like message or the RRC setup request like message is transmitted.

17. A wireless device for reporting quantized early measurements to a network node, the wireless device comprising one or more processors and a memory, the memory comprising instructions to cause the wireless device to:
when the wireless device is transitioning from a dormant state to a connected state, transmit, to a network node:
a Radio Resource Control (RRC) resume request like message or an RRC setup request like message;

a report of one or more quantized early measurements; and wherein the report of the one or more quantized early measurements comprises one or more indications related to quantized early measurement results for one or more cells and/or frequencies for which the wireless device was configured to perform early measurements;

wherein the indication is comprised in the RRC resume request like message or the RRC setup request like message; and wherein the one or more indications is used by the network node to configure cells for the wireless device.

18. A method performed by a network node, the method comprising:
receiving, from the wireless device:
a Radio Resource Control (RRC) resume request like message or a RRC setup request like message;
a report of one or more quantized early measurements; and
wherein the report of the one or more quantized early measurements comprises one or more indications related to quantized early measurement results for one or more cells and/or frequencies for which the wireless device was configured to perform early measurements; and
wherein a single-bit indication is comprised in the RRC resume request like message or the RRC setup request like message; and
using the one or more indications for configuring cells for the wireless device.

19. The method of claim 18 further comprising performing one or more actions based on the report of the one or more quantized early measurements.

20. A network node for a cellular communications network, the network node comprising one or more processors and a memory, the memory comprising instructions to cause the network node to:
receive, from the wireless device:
a Radio Resource Control (RRC) resume request like message or a RRC setup request like message;
a report of one or more quantized early measurements; and
wherein the report of the one or more quantized early measurements comprises one or more indications related to quantized early measurement results for one or more cells and/or frequencies for which the wireless device was configured to perform early measurements; and
wherein a single-bit indication is comprised in the RRC resume request like message or the RRC setup request like message; and
using the one or more indications for configuring cells for the wireless device.

21. The network node of claim 20 wherein the network node is further adapted to perform one or more actions based on the report of the one or more quantized early measurements.

* * * * *